United States Patent
Jiao

(10) Patent No.: US 11,584,391 B2
(45) Date of Patent: Feb. 21, 2023

(54) SYSTEM AND METHOD FOR COMMUNICATING VEHICLE ACTIONS

(71) Applicant: Pony AI Inc., Grand Cayman (KY)

(72) Inventor: Jialin Jiao, South San Francisco, CA (US)

(73) Assignee: Pony AI Inc., Grand Cayman (KY)

( * ) Notice: Subject to any disclaimer, the term of this patent is extended or adjusted under 35 U.S.C. 154(b) by 332 days.

(21) Appl. No.: 16/821,679

(22) Filed: Mar. 17, 2020

(65) Prior Publication Data

US 2021/0291861 A1 Sep. 23, 2021

(51) Int. Cl.
| | | |
|---|---|---|
| *B60W 60/00* | (2020.01) | |
| *B60W 30/18* | (2012.01) | |
| *B60W 40/06* | (2012.01) | |
| *G01C 21/36* | (2006.01) | |
| *B60Q 5/00* | (2006.01) | |
| *H04W 4/46* | (2018.01) | |
| *G06V 20/58* | (2022.01) | |

(52) U.S. Cl.
CPC ......... *B60W 60/0011* (2020.02); *B60Q 5/006* (2013.01); *B60W 30/18163* (2013.01); *B60W 40/06* (2013.01); *G01C 21/367* (2013.01); *G06V 20/58* (2022.01); *H04W 4/46* (2018.02); *B60W 2554/4041* (2020.02); *B60W 2554/4045* (2020.02); *B60W 2556/50* (2020.02); *B60W 2556/65* (2020.02)

(58) Field of Classification Search
CPC ....... B60W 60/0011; B60W 30/18163; B60W 40/06; B60W 2554/4041; B60W 2556/50; B60W 2556/65; B60W 2554/4045; H04W 4/46; G06V 20/58; B60Q 5/006; G01C 21/367
See application file for complete search history.

(56) References Cited

U.S. PATENT DOCUMENTS

| | | | |
|---|---|---|---|
| 7,889,062 B1 | 2/2011 | Smith | |
| 9,620,014 B2 | 4/2017 | Goudy | |
| 9,694,736 B2 | 7/2017 | Williams | |
| 10,493,622 B2* | 12/2019 | Sweeney | G05D 1/0016 |
| 11,367,358 B1* | 6/2022 | Vemuri | G08G 1/20 |
| 2019/0171215 A1* | 6/2019 | Tatourian | G05D 1/0246 |
| 2019/0310636 A1* | 10/2019 | Halder | G05D 1/0274 |
| 2020/0117187 A1* | 4/2020 | Kothari | G06F 21/32 |
| 2021/0129858 A1* | 5/2021 | Omasta | B60W 40/09 |
| 2021/0291659 A1* | 9/2021 | Kühne | G01S 7/04 |
| 2021/0291861 A1* | 9/2021 | Jiao | G06V 20/56 |
| 2022/0066570 A1* | 3/2022 | Takabatake | G06F 3/04842 |

* cited by examiner

*Primary Examiner* — Hussein Elchanti

(57) ABSTRACT

Provided herein is a system and method of a vehicle that communicates an intended action of the vehicle. The system comprises one or more sensors; one or more processors; and a memory storing instructions that, when executed by the one or more processors, causes the system to perform capturing data from the one or more sensors of another vehicle or a road condition; determining an intended action of the vehicle based on the captured data; simulating the intended action of the vehicle on a map; communicating, within the vehicle, the intended action of the vehicle; and navigating the vehicle based on the intended action of the vehicle.

16 Claims, 22 Drawing Sheets

SYSTEM AND METHOD FOR COMMUNICATING VEHICLE ACTIONS

TECHNICAL FIELD

The present disclosure relates generally to vehicles such as assisted-driving vehicles or autonomous vehicles (AVs), and in particular, some embodiments relate to such vehicles communicating a vehicle action to a safety driver.

BACKGROUND

A vehicle, such as an autonomous vehicle (AV), may require at least one safety driver to be present in case the software of the vehicle is compromised, defective, or otherwise controls the vehicle in an unsafe or undesirable manner. As a security measure, many autonomous vehicles are operated with at least two persons inside the vehicle. One person may focus on observing road and traffic conditions and what actions the vehicle is taking while another person may be ready to intervene to override the software of the vehicle if necessary or desired. Requiring two persons to be present inside a vehicle during its operation may be inconvenient. This shortfall is addressed by the present disclosures, which provide augmented communications to inform a person inside the vehicle of what actions the vehicle will be, or intends to take. Additionally, using the present disclosures, consumer confidence in reliability of such vehicles may also increase.

SUMMARY

Described herein are systems and methods for communicating an intended vehicle action. Various embodiments of the present disclosure provide a system comprising one or more sensors; one or more processors; and a memory storing instructions that, when executed by the one or more processors, causes the system to perform: capturing data from one or more sensors of another vehicle or data of a road condition; determining an intended action of the vehicle based on the captured data; simulating the intended action of the vehicle on a map; communicating, within the vehicle, the intended action of the vehicle; and navigating the vehicle based on the intended action of the vehicle.

In some embodiments, the simulating of the intended action of the vehicle is simultaneous with the communicating of the intended action.

In some embodiments, the instructions further cause the system to perform communicating, with another vehicle, the intended action of the vehicle.

In some embodiments, the capturing of data comprises capturing data from the one or more sensors of another vehicle closest to a current position of the vehicle.

In some embodiments, the capturing of data comprises capturing data of the road condition, the road condition comprising an obstacle.

In some embodiments, the determining an intended action of the vehicle comprises determining to change a lane, change a direction, or swerve to avoid the obstacle.

In some embodiments, the determining an intended action of the vehicle comprises determining whether to yield to another vehicle.

In some embodiments, the instructions further cause the system to perform:
in response to communicating the intended action of the vehicle, receiving a command; adjusting the intended action of the vehicle based on the command.

In some embodiments, the instructions further cause the system to perform:
receiving an input from another vehicle of an intended action of the another vehicle; adjusting the intended action of the vehicle based on the input; and communicating the adjusted intended action to the another vehicle and within the vehicle.

In some embodiments, the system further comprises a speaker configured to communicate the intended action within the vehicle.

Various embodiments of the present disclosure provide a method implemented by a computing system including one or more processors and storage media storing machine-readable instructions, wherein the method is performed using the one or more processors. The method comprises: capturing data from the one or more sensors of another vehicle or a road condition; determining an intended action of the vehicle based on the captured data; simulating the intended action of the vehicle on a map; communicating, within the vehicle, the intended action of the vehicle; and navigating the vehicle based on the intended action of the vehicle.

In some embodiments, the simulating of the intended action of the vehicle is simultaneous with the communicating of the intended action.

In some embodiments, the method further comprises communicating, with another vehicle, the intended action of the vehicle.

In some embodiments, the capturing of data comprises capturing data from the one or more sensors of another vehicle closest to a current position of the vehicle.

In some embodiments, the capturing of data comprises capturing data of the road condition, the road condition comprising an obstacle.

In some embodiments, the determining an intended action of the vehicle comprises determining to change a lane, change a direction, or swerve to avoid the obstacle.

In some embodiments, the determining an intended action of the vehicle comprises determining whether to yield to another vehicle.

In some embodiments, the method further comprises, in response to communicating the intended action of the vehicle, receiving a command; and adjusting the intended action of the vehicle based on the command.

In some embodiments, the method further comprises, receiving an input from another vehicle of an intended action of the another vehicle; adjusting the intended action of the vehicle based on the input; and communicating the adjusted intended action to the another vehicle and within the vehicle.

In some embodiments, the communicating the intended action of the vehicle comprises communicating using a speaker.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
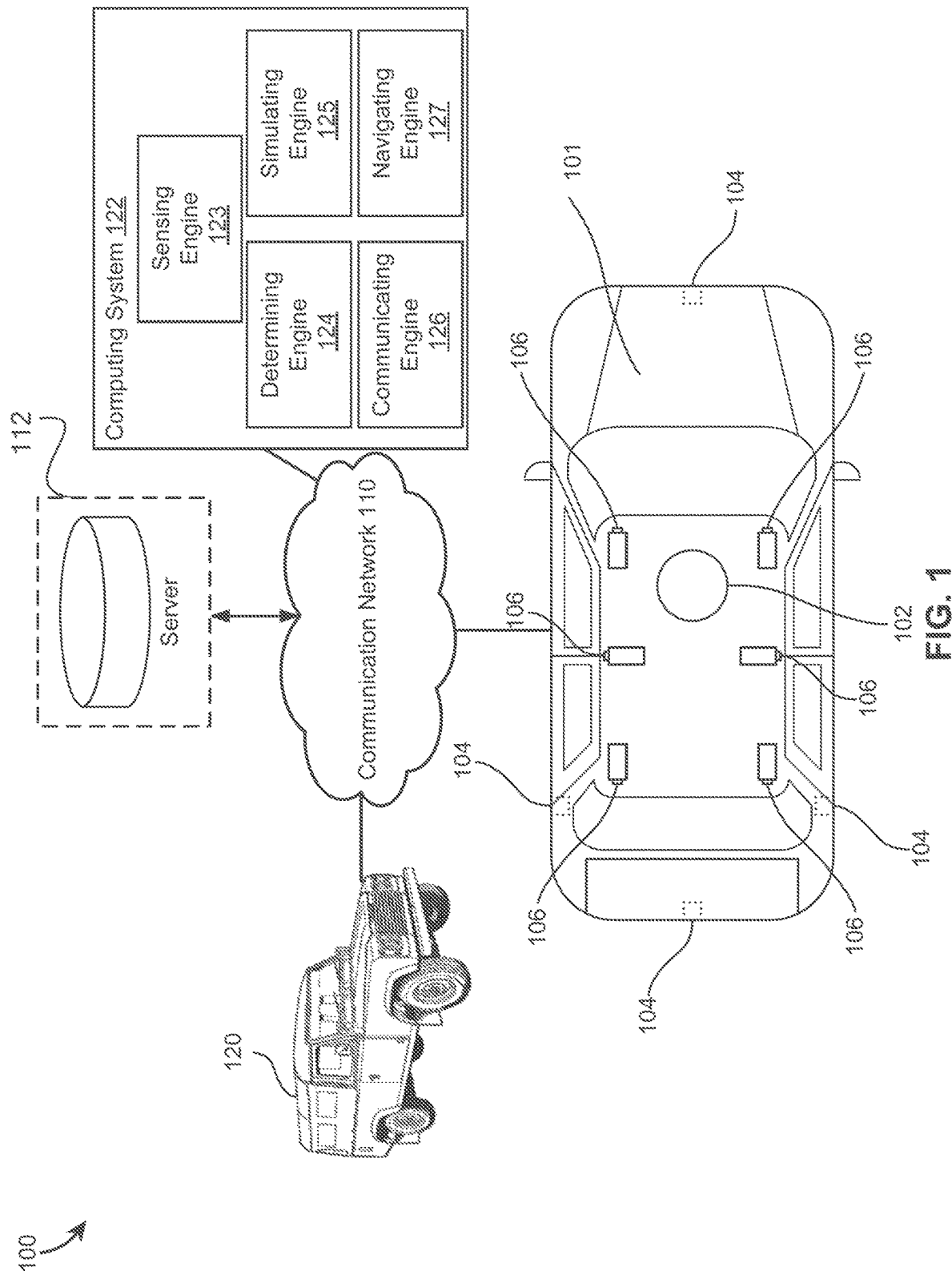
FIG. 1 illustrates an example environment of a system that captures data from one or more sensors of another vehicle or data of a road condition, determines an intended action of the vehicle based on the captured data, simulates the intended action of the vehicle, communicates, within the vehicle, the intended action of the vehicle, and navigates the vehicle based on the intended action of the vehicle, according to an embodiment of the present disclosure.

FIG. 1 illustrates an example environment 100 of a system that generates initial trajectories along a route to be travelled by the vehicle, acquires one or more trajectories of other vehicles along the route, adjusts the initial trajectories based on the one or more trajectories of other vehicles, and navigates the vehicle based on the adjusted initial trajectories, according to an embodiment of the present disclosure. In FIG. 1, a vehicle such as an autonomous vehicle 101 may include myriad sensors (LiDAR sensors 102, radar sensors 104, cameras 106, GPS, sonar, ultrasonic, IMU (inertial measurement unit), accelerometers, gyroscopes, magnetometers, and FIR (far infrared) sensors) to detect and identify objects in the surrounding. The sensor data may comprise pictorial or image data (e.g., pictures, videos), audio data, audiovisual data, atmospheric data (e.g., temperature, pressure, elevation, and/or the like) captured in either real-time or with a time delay. For example, the LiDAR sensors 102 can generate a three-dimensional map of the environment. The LiDAR sensors 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The vehicle 101 may be connected, via a communication network 110, to at least one computing system 122 that includes one or more processors and memory. The one or more processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, one or more computing systems of the data platform may receive and process search queries to obtain sensor data, process the sensor data, determine an intended action, and/or perform the intended action such as a driving action, yielding, passing another vehicle, speeding up, or parking.

In some embodiments, the computing system 122 may include sensing engine 123, determining engine 124, simulating engine 125, communicating engine 126, and navigating engine 127. In general, the computing system 122 may be implemented, in whole or in part, with software that is capable of running on the computing system 122. In one example, the computing system 122 may be implemented as or within a software application running on one or more computing devices (e.g., user or client devices) and/or one or more servers (e.g., network servers or cloud servers, servers 112). In some instances, various aspects of the sensing engine 123, the determining engine 124, the simulating engine 125, the communicating engine 126, and the navigating engine 127 may be implemented in one or more computing systems and/or devices. In some instances, one or more of the sensing engine 123, the determining engine 124, the simulating engine 125, the communicating engine 126, and navigating engine 127 may be combined or integrated into a single processor, and some or all functions performed by one or more of the sensing engine 123, the determining engine 124, the simulating engine 125, the communicating engine 126, and the navigating engine 127 may not be spatially separated, but instead may be performed by a common processor. The environment 100 may also include one or more servers 112 accessible to the computing system 122. The one or more servers 112 may store sensor data from the vehicle 101, one or more sensors of other vehicles such as another vehicle 120, which may be an AV, one or more satellite maps, and/or one or more road sensors such as sensors on traffic lights. In some embodiments, the one or more servers 112 may integrate data from different sensors. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the sensing engine 123, the determining engine 124, the simulating engine 125, the communicating engine 126, and the navigating engine 127 to provide the various features described herein. In some embodiments, the one or more servers 112 may store data that may be accessed by the another vehicle 120. As an example, data from the sensing engine 123 may be stored in the one or more servers 112 and accessed by the another vehicle 120. The another vehicle 120 may also acquire data from the vehicle 101, either directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces.

The sensing engine 123 may be configured to control operations of or relating to the sensors such as the LiDAR sensors 102, radar systems 104 and cameras 106, and process data acquired by the sensors. The sensing engine 123 may be configured to process data acquired from the sensors such as the LiDAR sensors 102, radar systems 104 and cameras 106, and detect a signal from a source (e.g., another vehicle such as the another vehicle 120, a pedestrian, or a road sign). In some embodiments, the signal may be a flashing light, a flashing row of lights, a blinking light, or a blinking row of lights on a side of the source facing the vehicle 101. The flashing or blinking light or the flashing or blinking row of lights may indicate that the source intends to overtake the vehicle 101 and to switch into a lane occupied by the vehicle 101, at a position in front of the vehicle 101. The sensing engine 123, in some embodiments, may be configured to determine a relative position of the source with respect to the vehicle 101. For example, the sensing engine 123 may be configured to determine whether the vehicle 101 is completely in front of or completely behind the source, with respect to a travelling or driving direction of the vehicle 101. If the source is not completely in front of or completely behind the vehicle 101 (for example, if a back portion of the vehicle 101 is aligned with a front portion of a source, and the vehicle 101 and the source), the sensing engine 123 may detect a lateral movement of the source even if the source does not signal. The lateral movement may be a movement from a lane occupied by the source towards a lane occupied by the vehicle 101, in a direction perpendicular to the driving direction of the vehicle 101. In some examples, the sensing engine 123 may detect whether a distance of a lateral movement, or how much the source has decreased its lateral distance from the vehicle 101, is above a threshold. In such a manner, the sensing engine 123 may be configured to detect whether a source (e.g., the another vehicle 120) is intending to overtake the vehicle 101 and to make a lane change, even when the source does not provide a signal, which may occur when the source has broken signals (e.g., lights not working). In some embodiments, the sensing engine 123 may only detect a lateral movement of a source if the source is not completely in front of or behind the vehicle 101, or if the source is within a field of view of the vehicle 101. In some embodiments, the sensing engine 123 may further be configured to detect pedestrians or people, for example, crossing a street. The sensing engine 123 may further be configured to recognize walking movements of pedestrians or people, and to recognize hand gestures or hand signals from pedestrians such as an upraised hand to indicate that the pedestrian is intending to cross a street. The sensing engine 123 may further be configured to detect and distinguish bicycles and motorcycles from other vehicles. The sensing engine 123 may be configured to control operations of or relating to the sensors such as the LiDAR sensors 102, radar systems 104 and cameras 106, and process data acquired by the sensors. The sensing engine 123 may capture a field of view including one or more vehicles within a vicinity of the vehicle 101. The sensing engine 123 may capture data of one or more sensors of another vehicle nearby, or closest to, a current position of the vehicle 101 and/or one or more vehicles within a predetermined distance of the vehicle 101. The sensing engine 123 may capture data of an obstacle such as a pothole, bump, skidding or slippery surface, chemical hazard, animal, or other irregularity on a road.

In response to the sensing engine 123 detecting and/or processing a signal, the determining engine 124 may determine an intended action of the vehicle 101 based on the data captured by the sensing engine 123. For example, an intended action of the vehicle 101 may be in response to another vehicle immediately ahead or behind, or a closest other vehicle to the vehicle 101. For example, an intended action may comprise yielding or passing another vehicle, changing a lane, waiting for another vehicle to pass a stop sign, pulling over to a side of a road, turning into a parking lot, parking on a sidewalk, making a U-turn, or moving around a stopped vehicle. The intended action may comprise determining to change a lane, change a direction, or swerving to avoid an obstacle detected by the sensing engine 123.

The simulating engine 125 may comprise displaying or pictorially showing the intended action of the vehicle 101, a current location and orientation of the vehicle 101, along with other environmental and traffic surroundings, on a map, such as a satellite map or a high definition (HD) map inside the vehicle 101. The simulating engine 125 may display or show the intended action of the vehicle on the map simultaneously with communication of the intended action, as done by the communicating engine 126.

The communicating engine 126 may comprise a speaker. The communicating engine 126, in some embodiments, may communicate the intended action of the vehicle 101 within the vehicle 101, to inform a person sitting inside the vehicle 101. The communicating engine 126 may also be configured to communicate the intended action of the vehicle 101 to one or more nearby other vehicles, such as another vehicle nearest the vehicle 101, and/or one or more vehicles within a predetermined distance of the vehicle 101. The communicating engine 126 may further be configured to receive communications from within the vehicle 101, such as from a person, for example, a safety driver, sitting inside the vehicle 101. The communicating engine 126 may receive a command from a person inside the vehicle 101, such as a command agreeing with the intended action or disagreeing with the intended action. In response, the determining engine 124 may adjust the intended action of the vehicle 101 based on the command, and/or allow the safety driver to take over the operation of the vehicle 101. In one example, the determining engine may determine an intended action of the vehicle 101 as yielding to another vehicle, as communicated by the communicating engine 126. However, the person inside the vehicle 101 may disagree and communicate a command that the person wishes to pass the another vehicle without yielding. The communicating engine 126 may receive the command from the person. The determining engine 124 may determine whether following the command from the person would be safe, for example, whether such action would exceed a safety threshold. If so, the determining engine 124 may adjust the intended action to reflect the command from the person or to allow the person to take over navigation of the vehicle 101. If the determining engine 124 determines that the action as commanded by the person is not safe, for example, if the action does not exceed a safety threshold, the determining engine 124 may continue with its current intended action, or to modify the intended action to an alternative that exceeds the safety threshold. The communicating engine 126 may communicate that such action as commanded by the person is unsafe and that the vehicle 101 will not adjust its intended action, or modify to an alternative action. If the person continues to insist, the vehicle 101 may attempt to pull over to a side of a road or evacuate to a safe location and shut down.

The communicating engine 126 may further be configured to receive communications from one or more nearby other vehicles, regarding the intended actions of the one or more nearby other vehicles. The determining engine 124 may determine whether the intended actions of the one or more nearby other vehicles are safe. If the determining engine 124 determines that the intended actions of the one or more nearby other vehicles do not exceed a predetermined safety threshold or exceed a predetermined risk factor, the communicating engine 126 may communicate to the one or more nearby other vehicles that their intended actions are unsafe. Otherwise, if the determining engine 124 determines that the intended actions of the one or more nearby other vehicles are safe, the determining engine 124 may determine a responsive action to the intended actions of the one or more nearby other vehicles and the communicating engine 126 may communicate the responsive action to the one or more nearby other vehicles.

The navigating engine 127 may be configured to navigate the vehicle 101 based on, or according to, the intended action or the responsive action of the vehicle 101.

FIGS. 2A-2E, 3-9, 10A-10B, and 11-15 illustrate exemplary implementations of the system, according to embodiments of the present disclosure. In FIGS. 2A-2E, 3-9, 10A-10B, and 11-15, any reference to a vehicle performing a determination or taking an action may be understood to mean that one or more processors of the vehicle may perform the determination or take the action. In FIGS. 2A-2E, 3-9, 10A-10B, and 11-15, a vehicle (e.g., 210, 220, 230, 250, 260) may communicate intended actions and navigate according to the intended actions. In FIGS. 3-9, a vehicle (e.g., 310, 360, 410, 510, 610, 710, 810, or 910) may communicate its intended actions related to yielding to other traffic. In FIGS. 10A, 10B, and 11-15, a vehicle (e.g., 1010, 1110, 1310, 1360, 1410, 1510) may communicate intended actions such as making a left turn, passing a vehicle, pulling over to a side of a road, making a right turn on a red light, passing a stopped bus, or whether to proceed or yield at an intersection or a stop sign. Additionally, a vehicle may take an intended action based on a safety of the intended action. The safety may encompass a likelihood of avoiding a collision with one or more other vehicles or a pedestrian.

Figure 2A:
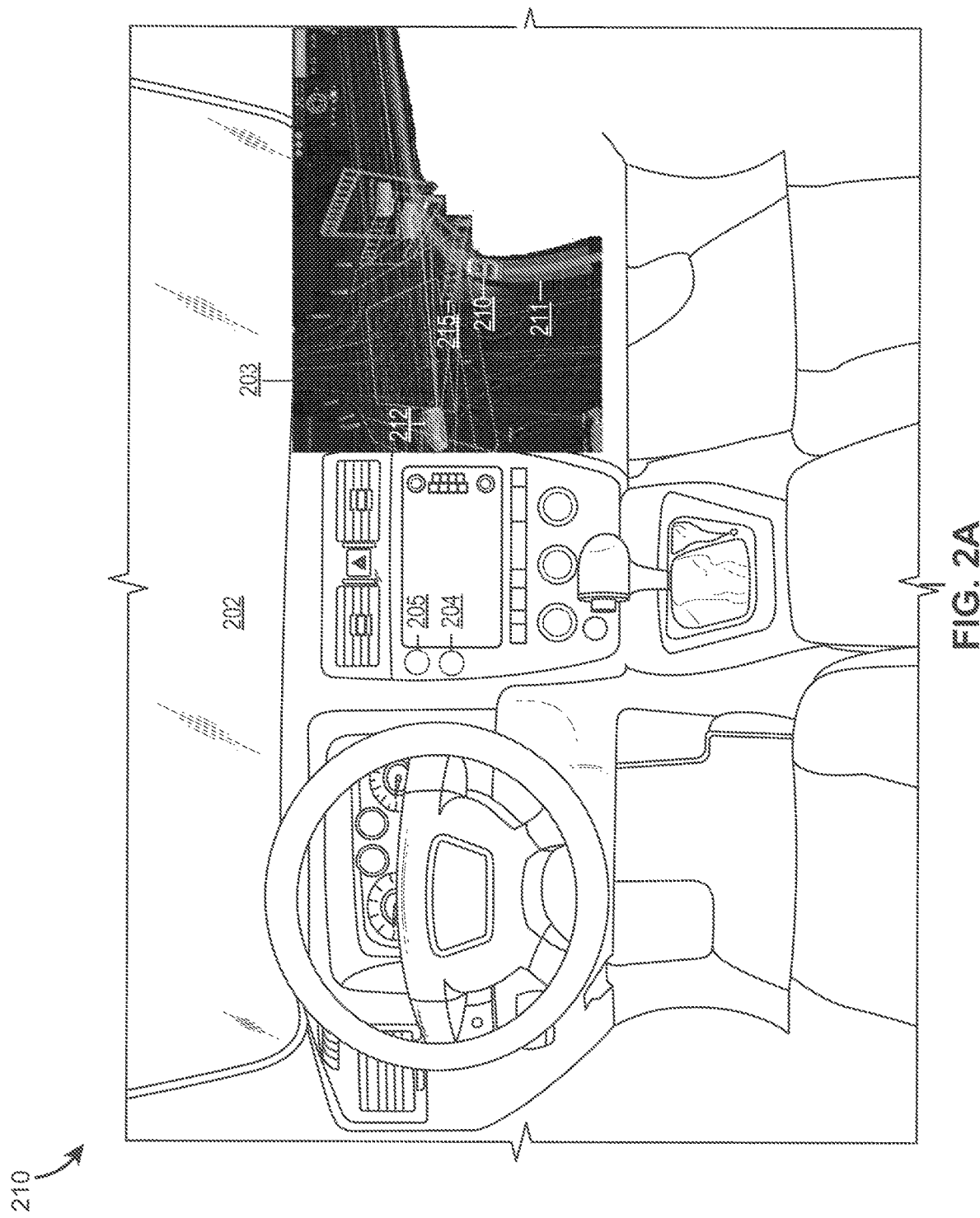
FIGS. 2A-2E, 3-9, 10A-10B, and 11-15 illustrate exemplary implementations of the system, according to an embodiment of the present disclosure.

In FIG. 2A, a vehicle 210, which may be implemented as the vehicle 101, may comprise an interior 202 of the vehicle 210, a map 203 inside the vehicle 210, a speaker 204 that outputs verbal commands regarding the intended action of the vehicle 210, and a microphone 205 that detects commands from a person inside the vehicle 210 or from another vehicle within a predetermined distance of the vehicle 210. In some embodiments, the map 203 may illustrate the vehicle 210 travelling along a trajectory 211. A gate 215 may indicate that an intended action of the vehicle 210 is to yield to another vehicle 212. A processor of the vehicle 210 such as the communicating engine 126 may output verbal commands that the vehicle 210 intends to yield, for example, via the speaker 204, to the person inside the vehicle 210 and/or to the other vehicle 212. The microphone 205 may detect a command, for example, from the person inside the vehicle 210, not to yield. If a processor of the vehicle 210, such as the determining engine 124, determines that the vehicle 210 may safely pass the another vehicle 212 without yielding, the determining engine 124 may adjust its intended action to conform to the command of the person. The communicating engine 126 may then communicate to the person and to the another vehicle 212 that the intended action of the vehicle 210 is passing the another vehicle 212 without yielding. In some embodiments, the determining engine 124 may allow the person inside the vehicle 210 to take over navigation or driving operations of the vehicle 210. If the determining engine 124 determines that the vehicle 210 cannot safely pass the another vehicle 212 without yielding, or determines that such action exceeds a safety threshold, the determining engine 124 may maintain its intended action of yielding to the another vehicle 212. The communicating engine 126 may communicate, to the person inside the vehicle 210, that the vehicle 210 is maintaining its intended action of yielding to the another vehicle 212. The communicating engine 126 may further communicate a relative or absolute location of the another vehicle 212 and/or describe a make, model, color, and size of the another vehicle 212 in order to clearly identify the another vehicle 212. The communicating engine 126 may further identify that the another vehicle 212 is approaching, for example, from a right lane or a left lane, and/or communicate a speed of the another vehicle 212 as the another vehicle 212 is approaching. If the person inside the vehicle 210 insists on not yielding, the determining engine 124 may pull over to a side of a road, evacuate, and/or shut down.

Figure 2B:
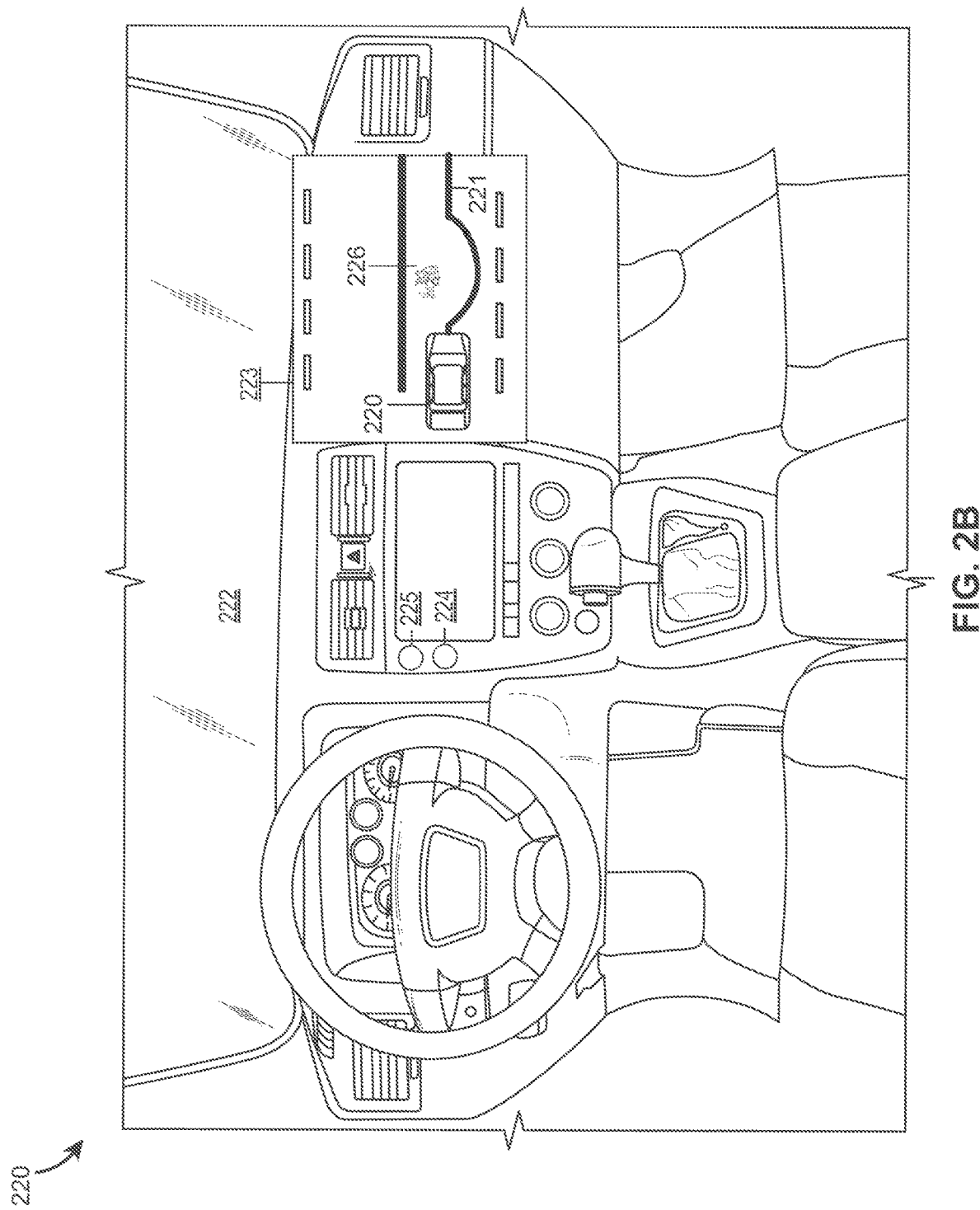

In FIG. 2B, a vehicle 220, which may be implemented as the vehicle 101, may comprise an interior 222 of the vehicle 220, a map 223 inside the vehicle 220, a speaker 224 that outputs verbal commands regarding the intended action of the vehicle 220, and a microphone 225 that detects commands from a person inside the vehicle 220 or from another vehicle within a predetermined distance of the vehicle 220. In some embodiments, the map 223 may illustrate the vehicle 220 travelling along a trajectory 221. The trajectory may comprise a curve in order for the vehicle 220 to avoid the obstacle 226. A processor of the vehicle 220 such as the communicating engine 126 may output verbal commands that the vehicle 220 intends to swerve or change lanes to avoid the obstacle 226. The commands may be broadcasted by the speaker 224 to the person inside the vehicle 220 and/or to another vehicle traveling on another lane to which the vehicle 220 may swerve while avoiding the obstacle 226.

The microphone 225 may detect a command, for example, from another vehicle in another lane, that the another vehicle is aware that the vehicle 220 is swerving. In some embodiments, the microphone 225 may detect a command from the person inside the vehicle 220, not to swerve or change lanes. If a processor of the vehicle 220, such as the determining engine 124, determines that the vehicle 220 may safely traverse the obstacle 226 without swerving, or determines that such action exceeds a safety threshold, the determining engine 124 may adjust its intended action to conform to the command of the person. The communicating engine 126 may then communicate to the person that the intended action of the vehicle 220 is traversing the obstacle 226 without swerving or yielding and instead just driving straight. If the determining engine 124 determines that the vehicle 220 cannot safely pass the obstacle 226 without yielding, the determining engine 124 may maintain its intended action of swerving to avoid the obstacle 226. The communicating engine 126 may communicate, to the person inside the vehicle 220, that the vehicle 220 is maintaining its intended action of swerving to avoid the obstacle 226. The communicating engine 126 may further communicate details of the obstacle 226 such as a location of the obstacle either in absolute terms or relative to the vehicle 220, and/or a size and nature of the obstacle 226.

Figure 2C:
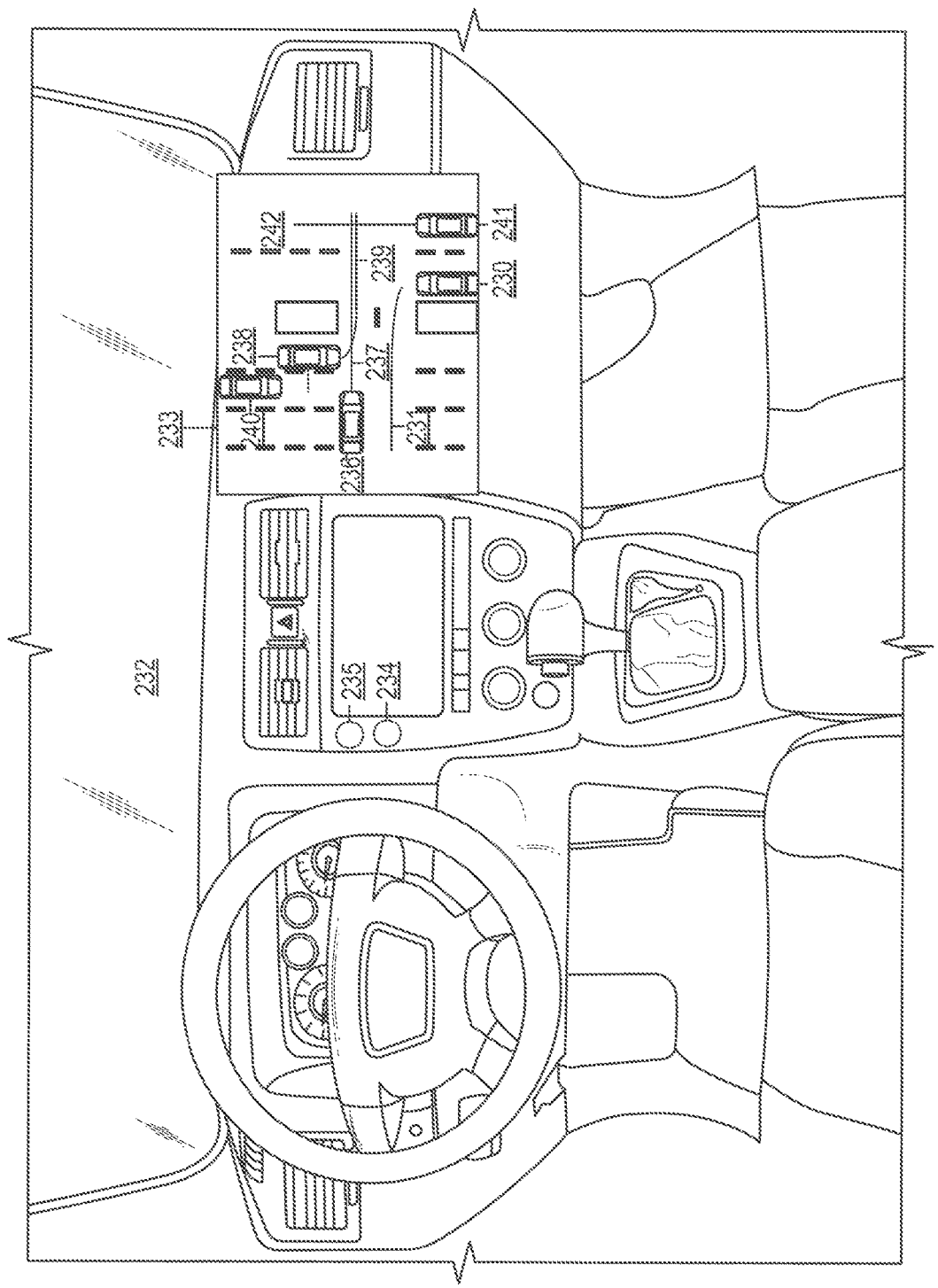

In FIG. 2C, a vehicle 230, which may be implemented as the vehicle 101, may comprise an interior 232 of the vehicle 230, a map 233 inside the vehicle 230, a speaker 234 that outputs verbal commands regarding the intended action of the vehicle 230, and a microphone 235 that detects commands from a person inside the vehicle 230 or from another vehicle within a predetermined distance of the vehicle 230. In some embodiments, the map 233 may illustrate the vehicle 230 travelling along a trajectory 231. The trajectory 231 may be determined based on a trajectory 242 of a vehicle 241 travelling in a same direction in an adjacent lane to the lane from which the vehicle 230 is turning, a trajectory 237 of a vehicle 236 travelling in a direction opposite from the lane to which the vehicle 230 is turning, and a trajectory 237 of the vehicle 238 that is turning from an opposite side. For example, the trajectory 231 may be determined such that the trajectory 231 maintains at least a predetermined distance from the trajectory 242, the trajectory 237, and/or the trajectory 239, while avoiding a collision with a vehicle 240 travelling from an opposite side.

In FIG. 2C, a processor of the vehicle 230 such as the communicating engine 126 may output verbal commands that the vehicle 230 intends to turn left. The commands may be broadcasted by the speaker 234 to the person inside the vehicle 230 and/or to another vehicle that may be affected by any intended actions of the vehicle 230. The verbal commands may comprise information about whether the vehicle 230 is yielding to opposing traffic, for example, to the vehicles 238 and/or 240, and information that the vehicle 230 is making a left turn. The communicating engine 126 may communicate to a vehicle directly behind the vehicle 230 that the vehicle 230 is attempting to make a turn, so that the vehicle directly behind may change lanes to avoid delay. The communicating engine 126 may also receive, via the microphone 235, commands from other vehicles such as the vehicle 238, the vehicle 240, the vehicle 236, and/or the vehicle 241. For example, the communicating engine 126 may receive a command from the vehicle 238 that it is intending to turn rather than go straight, so that the vehicle 230 would not need to yield to the vehicle 238. If the determining engine 124 determines that the vehicle 230 is intending to turn left but the person inside the vehicle 230 does not agree with the intended plan of action, the determining engine 124 may yield control of navigation and/or driving to the person inside the vehicle 230, and the communicating engine may communicate to the person inside the vehicle 230 to take over control.

Figure 2D:
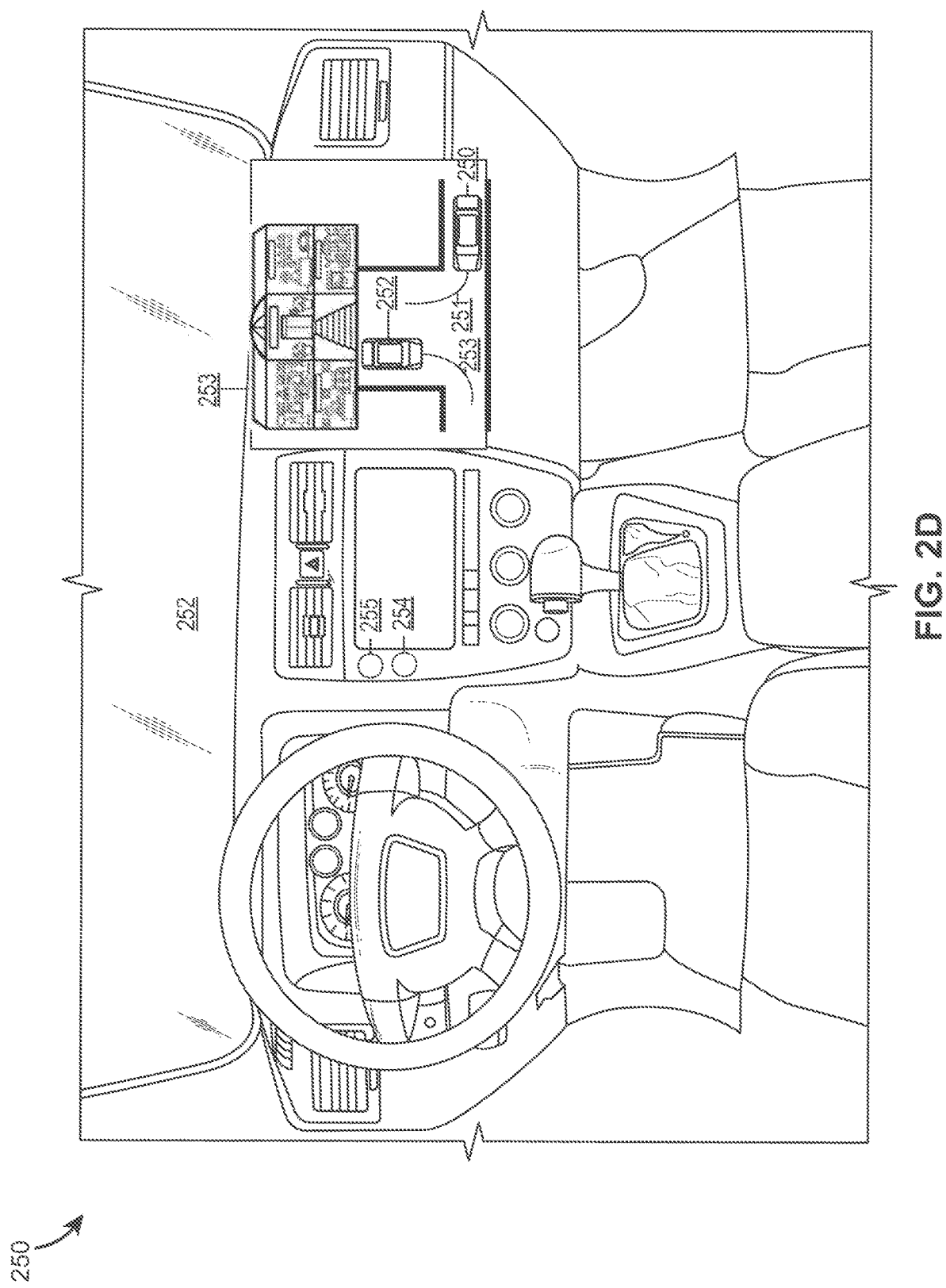

In FIG. 2D, a vehicle 250, which may be implemented as the vehicle 101, may comprise an interior 252 of the vehicle 250, a map 253 inside the vehicle 250, a speaker 254 that outputs verbal commands regarding the intended action of the vehicle 250, and a microphone 255 that detects commands from a person inside the vehicle 250 or from another vehicle within a predetermined distance of the vehicle 250. In some embodiments, the map 253 may illustrate the vehicle 250 travelling along a trajectory 251 into a parking lot or a mall. The trajectory 251 may be determined based on a trajectory 253 of a vehicle 252 exiting the parking lot or the mall and travelling in an opposite direction, so that the trajectory 251 maintains at least a predetermined distance from the trajectory 253.

In FIG. 2D, a processor of the vehicle 250 such as the communicating engine 126 may output verbal commands that the vehicle 250 intends to turn left. The commands may be broadcasted by the speaker 254 to the person inside the vehicle 250 and/or to another vehicle that may be affected by any intended actions of the vehicle 250, such as opposing traffic or other vehicles that are also turning into the parking lot or the mall, or other vehicles that are exiting the parking lot or the mall. The verbal commands may comprise information about whether the vehicle 250 is yielding to opposing traffic or other vehicles that are also turning into the parking lot or the mall, or other vehicles that are exiting the parking lot or the mall. The communicating engine 126 may communicate to a vehicle directly behind the vehicle 250 that the vehicle 250 is attempting to make a turn, so that the vehicle directly behind may change lanes or take another measure to avoid delay. If the determining engine 124 determines that the vehicle 250 may safely turn into the parking lot or the mall but the person inside the vehicle 250 does not agree with the intended plan of action, the determining engine 124 may yield control of navigation and/or driving to the person inside the vehicle 250, and the communicating engine may communicate to the person inside the vehicle 250 to take over control.

Figure 2E:
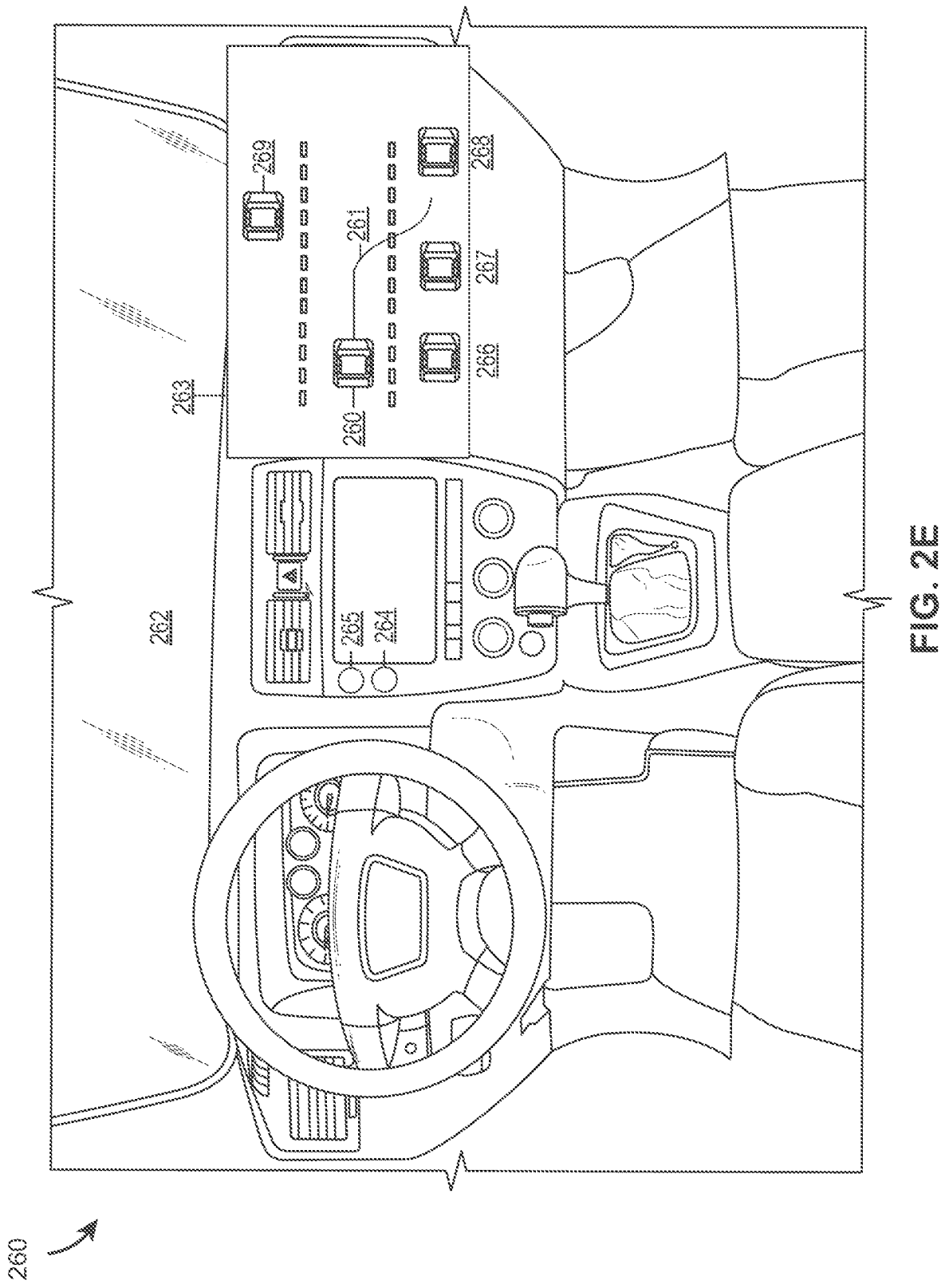

In FIG. 2E, a vehicle 260, which may be implemented as the vehicle 101, may comprise an interior 262 of the vehicle 260, a map 263 inside the vehicle 260, a speaker 264 that outputs verbal commands regarding the intended action of the vehicle 260, and a microphone 265 that detects commands from a person inside the vehicle 260 or from another vehicle within a predetermined distance of the vehicle 260. In some embodiments, the map 263 may illustrate the vehicle 260 intending to park into a parking spot between vehicles 267 and 268 and moving into the parking spot via a trajectory 261. The trajectory 261 may be determined based on a current distance of the vehicle 260 from a curb and a final distance of the vehicle 260 from the curb when the vehicle is parked, and based on coordinates of the vehicles 267 and 268, as well as a currently driving vehicle 269.

In FIG. 2E, a processor of the vehicle 260 such as the communicating engine 126 may output verbal commands that the vehicle 260 intends to park between the vehicles 267 and 268. The commands may be broadcasted by the speaker 264 to the person inside the vehicle 260 and/or to another vehicle that may be affected by any intended actions of the vehicle 260, such as opposing traffic or other vehicles driving behind the vehicle 260. If the determining engine 124 determines that the vehicle 260 may safely turn into the parking spot but the person inside the vehicle 260 does not agree, the determining engine 124 may yield control of navigation and/or driving to the person inside the vehicle 260, and the communicating engine may communicate to the person inside the vehicle 260 to take over control.

Figure 3:
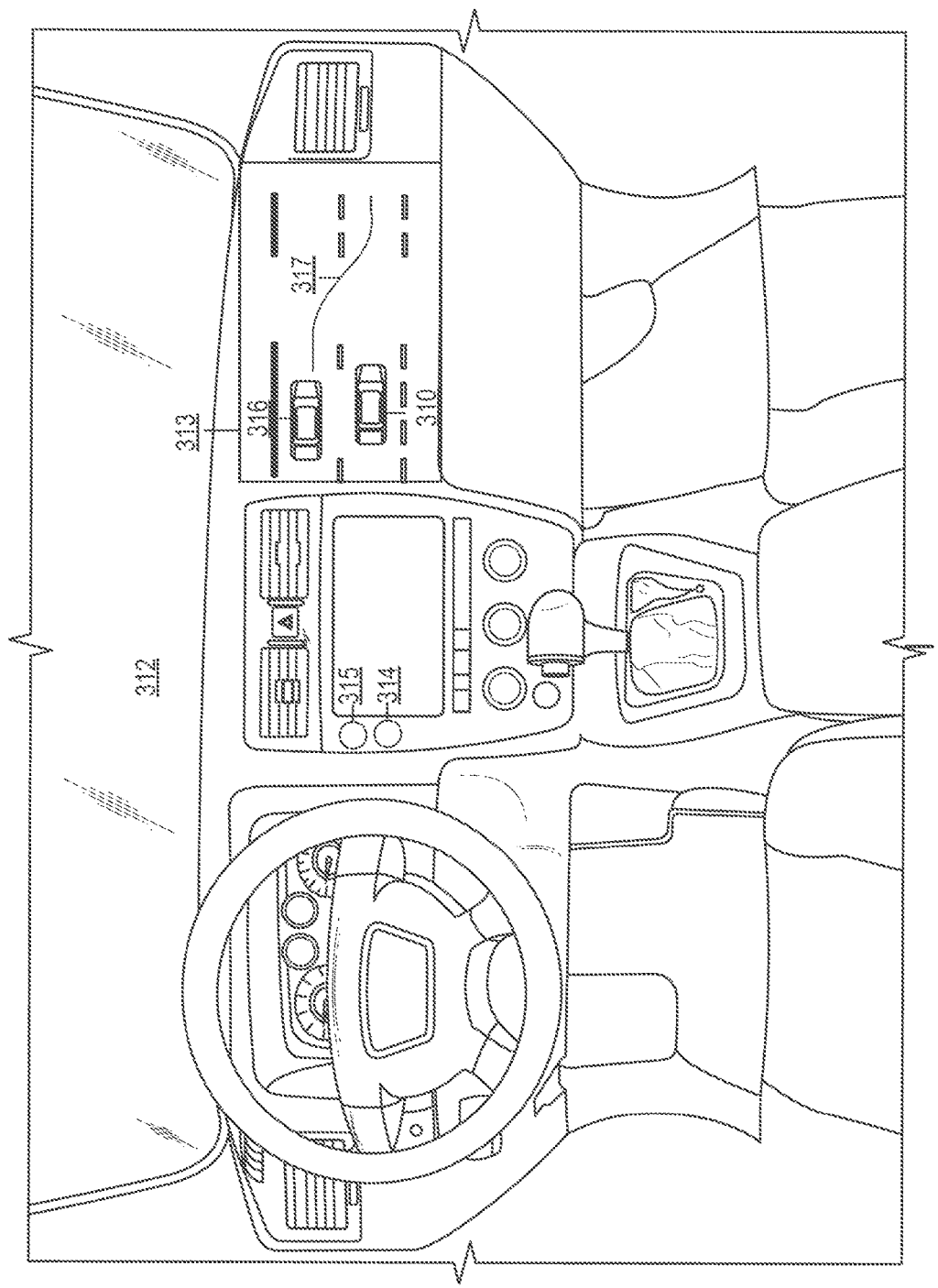

In FIG. 3, a vehicle 310, which may be implemented as the vehicle 101, may be driving in a different lane from another vehicle 316. The vehicle 310 may comprise an interior 312 of the vehicle 310, a map 313 inside the vehicle 310, a speaker 314 that outputs verbal commands regarding an intended or planned action of the vehicle 310, and a microphone 315 that detects commands from a person inside the vehicle 310 or from another vehicle or person within a predetermined distance of the vehicle 310. In some embodiments, the map 313 may illustrate a neighboring vicinity or environment of the vehicle 310, which includes the another vehicle 316 as it is preparing to merge. The determining engine 124 of the vehicle 310 may determine that a planned course of action of the vehicle 310 comprises yielding to the another vehicle 316, in response to the determining engine 124 determining that an action of yielding has a safety that is above a predetermined threshold. The another vehicle 316 may follow a trajectory 317 into a same lane occupied by the vehicle 310. The communicating engine 126 of the vehicle 310 may have received a command from the another vehicle 316 that the another vehicle 316 intends to pass the vehicle 310 and merge into the same lane. The communicating engine 126 of the vehicle 310 may output a command, for example, via the speaker 314, to a person inside the vehicle 310, to the another vehicle 316, and/or to a vehicle directly behind the vehicle 310, that the vehicle 310 will yield to the another vehicle 316. As a result of the communicating engine 126 verbally communicating a command to the person inside the vehicle 310, of what the vehicle 310 will do, the person inside the vehicle 310 does not need to stare at the map 313, and instead may focus on road conditions.

Figure 4:
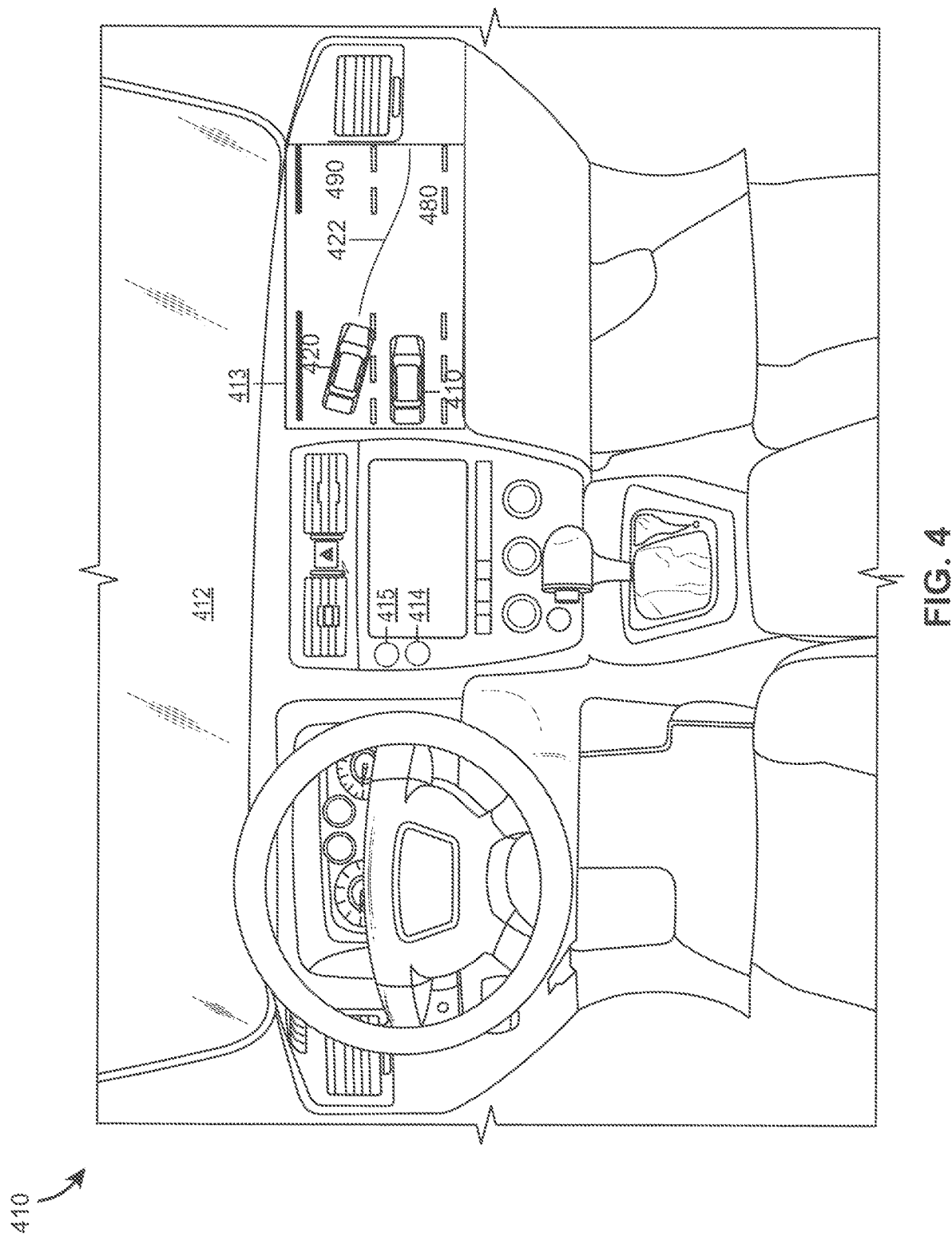

In FIG. 4, a vehicle 410, which may be implemented as the vehicle 101, may be driving in a lane 480, adjacent to a lane 490 in which another vehicle 420 is driving. The vehicle 410 may comprise an interior 412 of the vehicle 410, a map 413 inside the vehicle 410, a speaker 414 that outputs verbal commands regarding an intended or planned action of the vehicle 410, and a microphone 415 that detects commands from a person inside the vehicle 410 or from another vehicle or person within a predetermined distance of the vehicle 410. In some embodiments, the map 413 may illustrate a neighboring vicinity or environment of the vehicle 410, which includes the another vehicle 420. The another vehicle 420 may suddenly begin to merge into the lane 480 without warning. The determining engine 124 of the vehicle 410 may determine that a planned course of action of the vehicle 410 comprises immediately slowing down to allow the another vehicle 420 to safely merge, in response to the determining engine 124 determining that an action of immediately slowing down has a safety that is above a predetermined threshold. The another vehicle 420 may follow a trajectory 422 into the lane 480 occupied by the vehicle 410. The communicating engine 126 of the vehicle 410 may output a command, for example, via the speaker 414, to a person inside the vehicle 410, to the another vehicle 420, and/or to a vehicle directly behind the vehicle 410, that the vehicle 410 will immediately slow down.

Figure 5:
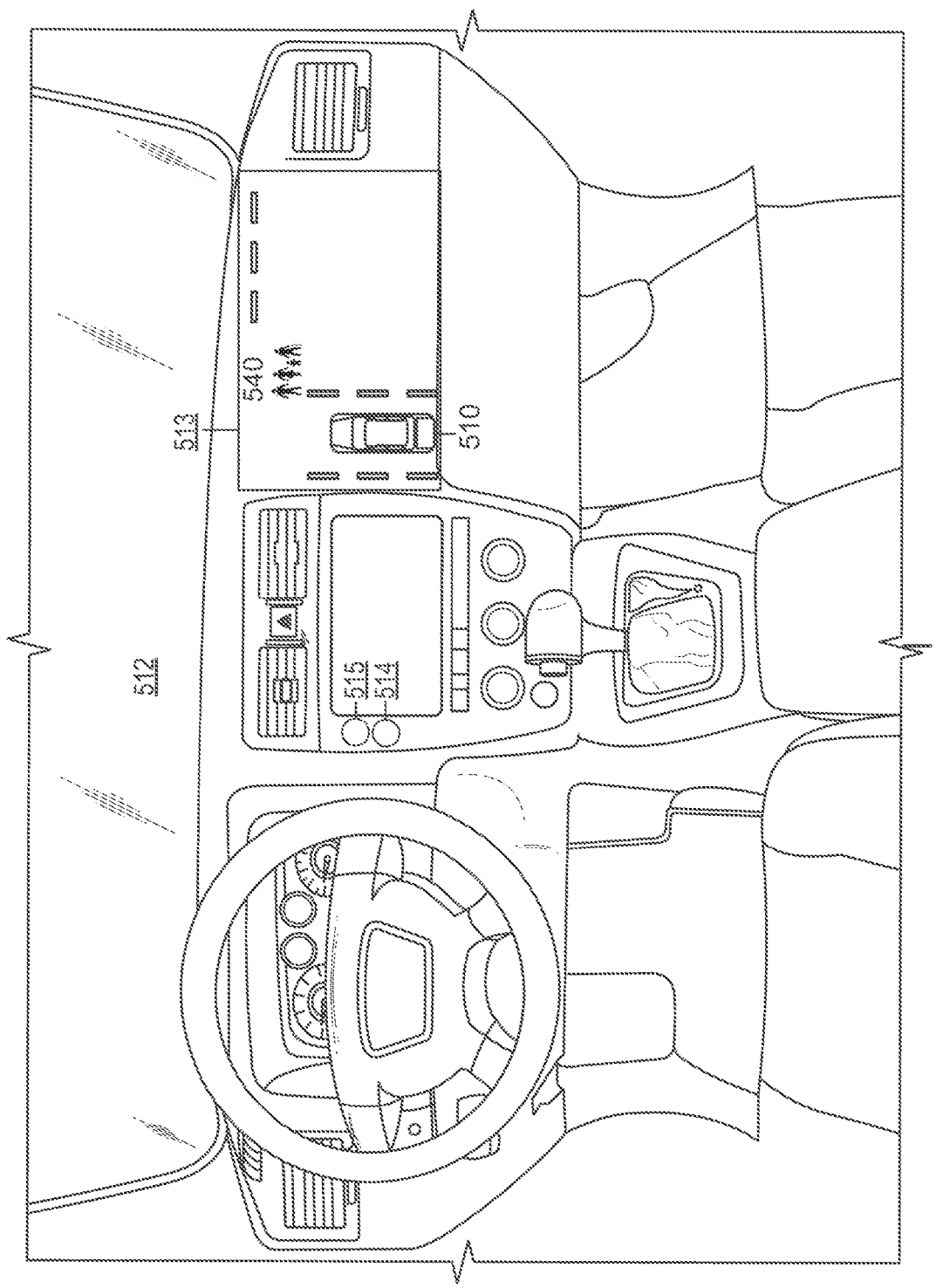

In FIG. 5, a vehicle 510, which may be implemented as the vehicle 101, may comprise an interior 512 of the vehicle 510, a map 513 inside the vehicle 510, a speaker 514 that outputs verbal commands regarding an intended or planned action of the vehicle 510, and a microphone 515 that detects commands from a person inside the vehicle 510 or from another vehicle or person within a predetermined distance of the vehicle 510. In some embodiments, the map 513 may illustrate a neighboring vicinity or environment of the vehicle 510, which includes pedestrians 540. The determining engine 124 of the vehicle 510 may determine that a planned course of action of the vehicle 510 comprises stopping or yielding to allow the pedestrians 540 to cross the street. The communicating engine 126 of the vehicle 510 may output a command, for example, via the speaker 514, to a person inside the vehicle 510, to the pedestrians 540, and/or to a vehicle directly behind the vehicle 510, that the vehicle 510 will slow down or yield to the pedestrians 540.

Figure 6:
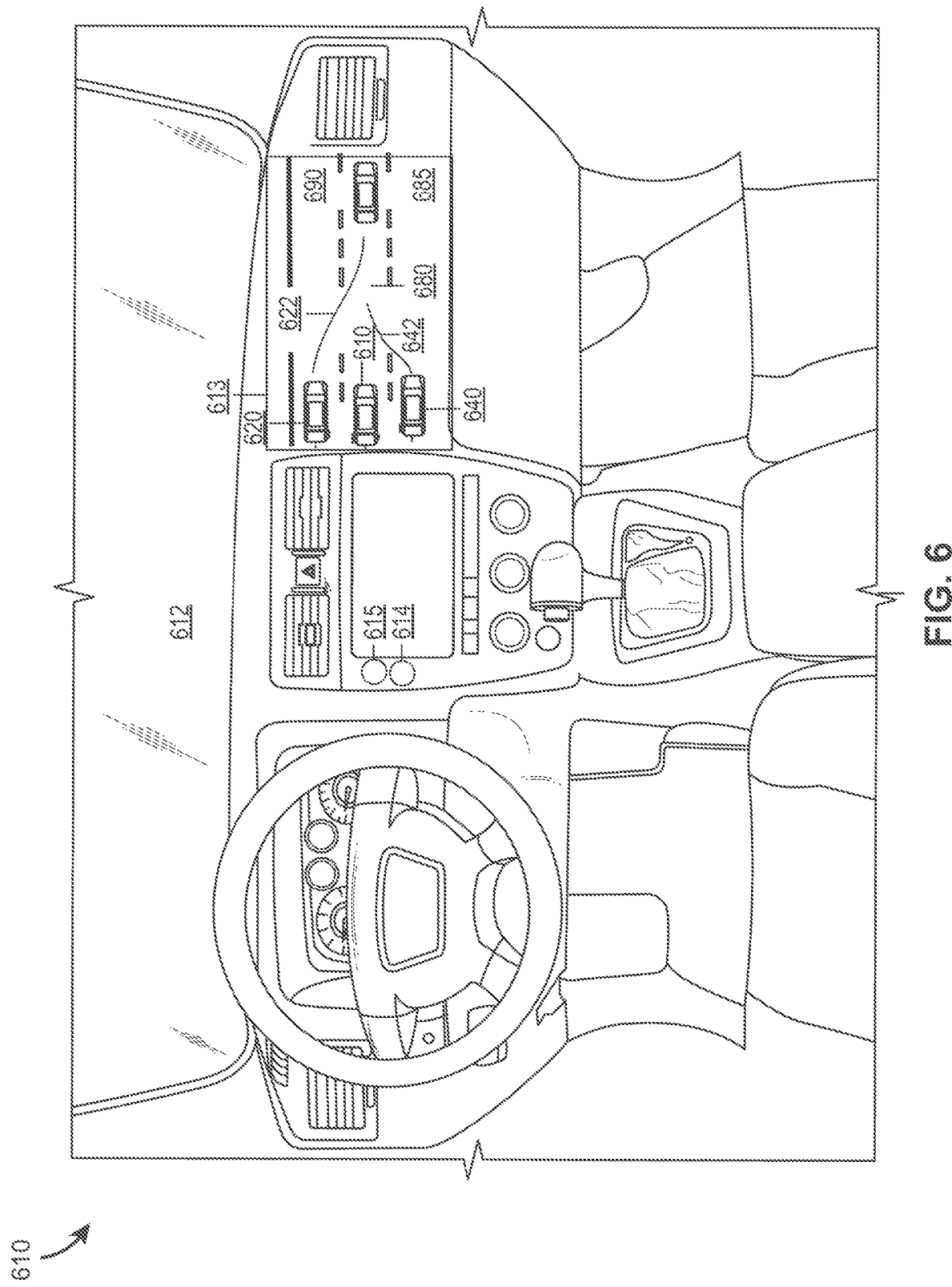

In FIG. 6, a vehicle 610, which may be implemented as the vehicle 101, may be driving in a lane 680, adjacent to a lane 685 in which another vehicle 640 is driving and adjacent to a lane 690 in which another vehicle 620 is travelling. The vehicle 610 may comprise an interior 612 of the vehicle 610, a map 613 inside the vehicle 610, a speaker 614 that outputs verbal commands regarding an intended or planned action of the vehicle 610, and a microphone 615 that detects commands from a person inside the vehicle 610 or from another vehicle or person within a predetermined distance of the vehicle 610. In some embodiments, the map 613 may illustrate a neighboring vicinity or environment of the vehicle 610, which includes the another vehicle 620 and the another vehicle 640. The another vehicle 640 may merge into the lane 680 via trajectory 642. The another vehicle 620 may merge into the lane 680 via trajectory 622. The determining engine 124 of the vehicle 610 may determine that a planned course of action of the vehicle 610 comprises yielding to the another vehicle 640 and to the another vehicle 620, in response to the determining engine 124 determining that an action of yielding to both the another vehicle 620 and the another vehicle 640 has a safety that is above a predetermined threshold. The communicating engine 126 of the vehicle 610 may have received a command from the another vehicle 640 and/or the another vehicle 620 that each of the respective vehicles intends to pass the vehicle 610 and merge into the same lane 680. The communicating engine 126 of the vehicle 610 may output a command, for example, via the speaker 614, to a person inside the vehicle 610, to the another vehicle 640, to the another vehicle 620, and/or to a vehicle directly behind the vehicle 610, that the vehicle 610 will yield to both the another vehicle 640 and/or the another vehicle 620.

Figure 7:
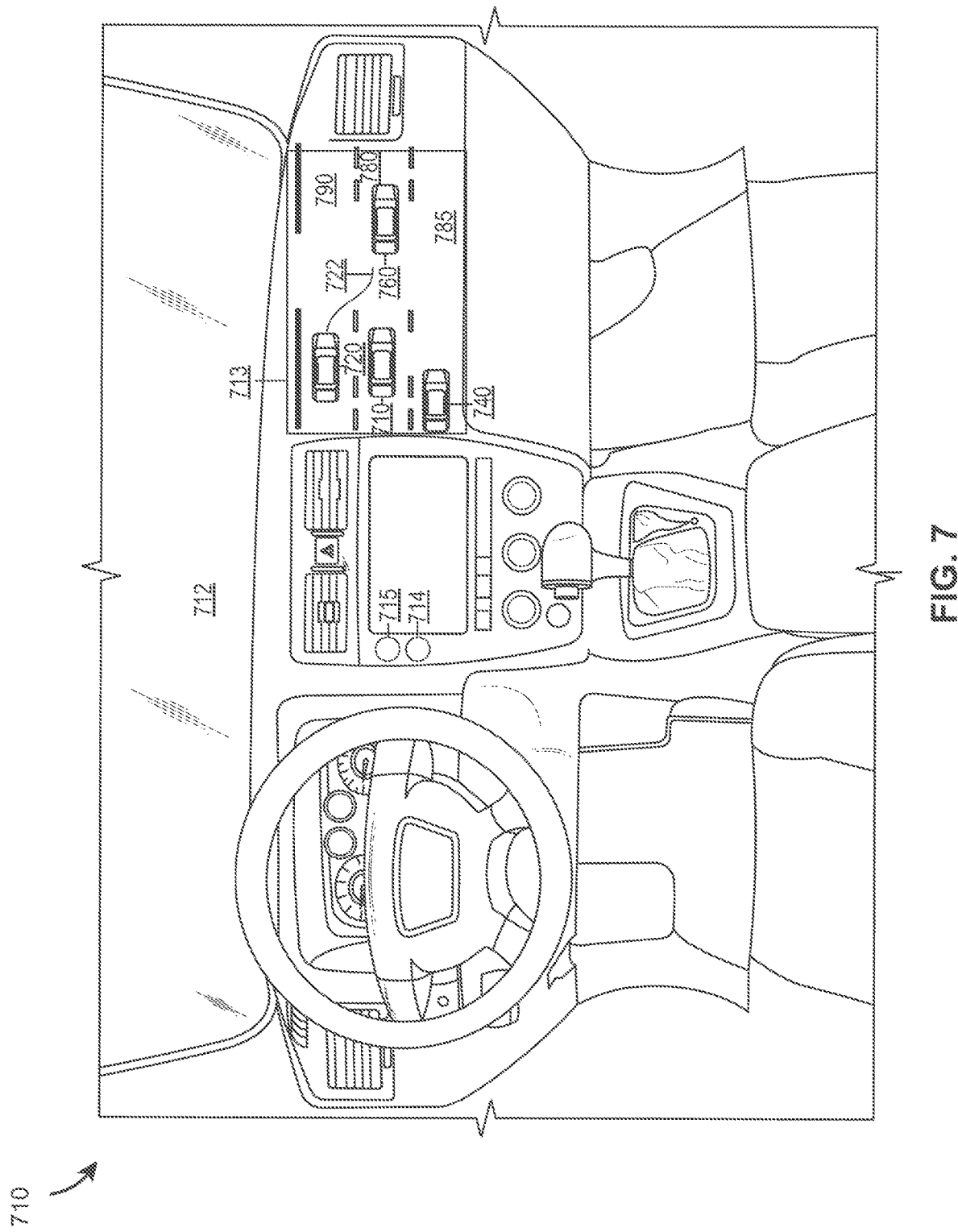

In FIG. 7, a vehicle 710, which may be implemented as the vehicle 101, may be driving in a lane 780, adjacent to a lane 785 in which another vehicle 740 is driving and adjacent to a lane 790 in which another vehicle 720 is travelling. The vehicle 710 may comprise an interior 712 of the vehicle 710, a map 713 inside the vehicle 710, a speaker 714 that outputs verbal commands regarding an intended or planned action of the vehicle 710, and a microphone 715 that detects commands from a person inside the vehicle 710 or from another vehicle or person within a predetermined distance of the vehicle 710. In some embodiments, the map 713 may illustrate a neighboring vicinity or environment of the vehicle 710, which includes the another vehicle 720 and the another vehicle 740. The another vehicle 720 may merge into the lane 780 via trajectory 722. The determining engine 124 of the vehicle 710 may determine that a planned course of action of the vehicle 710 comprises yielding to the another vehicle 720 as the another vehicle attempts to merge between the vehicle 710 and another vehicle 760. The determining engine 124 may determine that an action of yielding to the another vehicle 720 has a safety that is above a predetermined threshold. The communicating engine 126 of the vehicle 610 may have received a command from the another vehicle 720 that the another vehicle 720 intends to pass the vehicle 710 and merge into the lane 780. The communicating engine 126 of the vehicle 710 may output a command, for example, via the speaker 714, to a person inside the vehicle 710, to the another vehicle 720, the another vehicle 650, or the another vehicle 740, and/or to a vehicle directly behind the vehicle 710, that the vehicle 710 will yield to the another vehicle 720.

Figure 8:
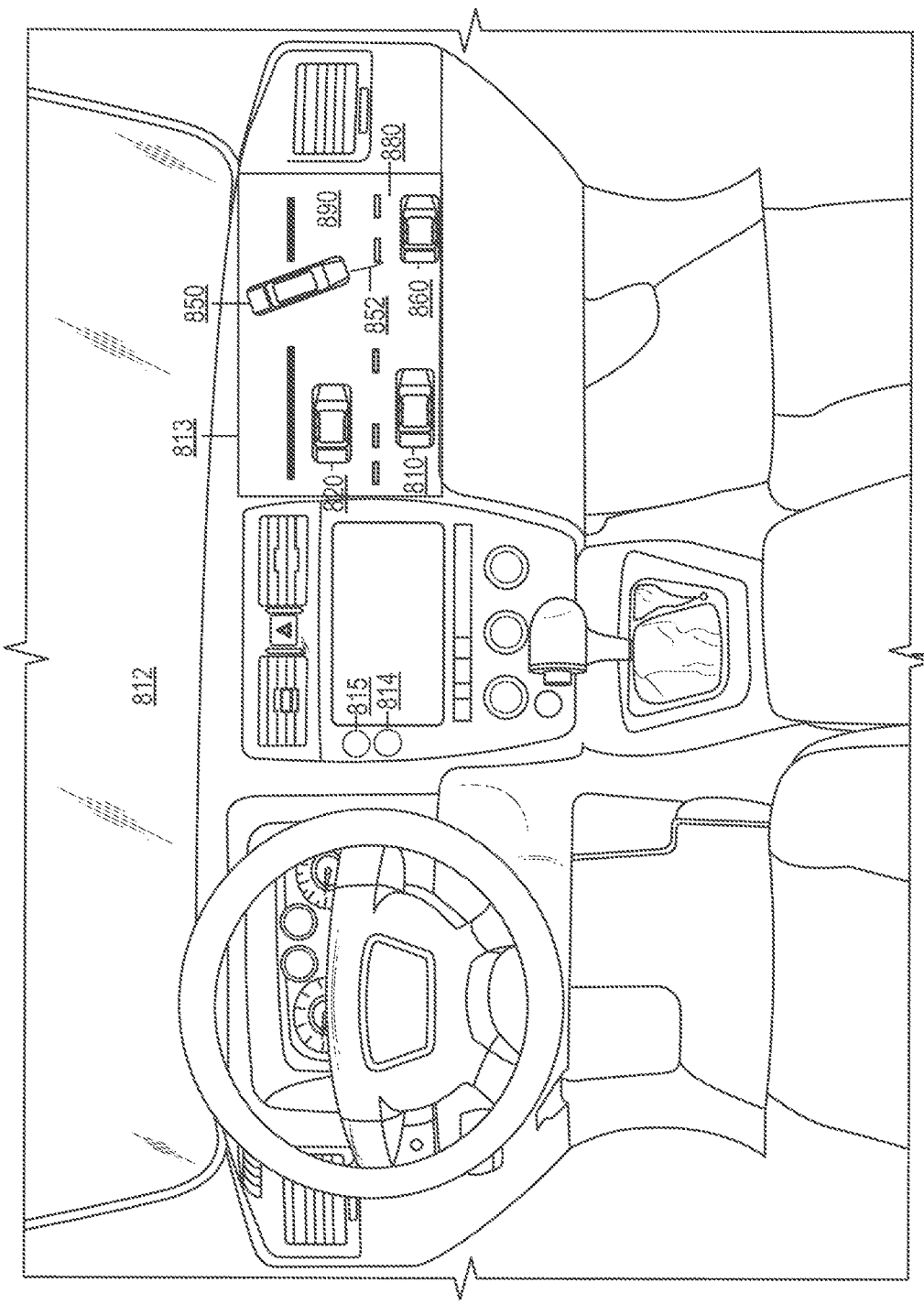

In FIG. 8, a vehicle 810, which may be implemented as the vehicle 101, may be driving in a lane 880, along with another vehicle 810. The lane 880 may be adjacent to a lane 890 in which another vehicle 820 is driving. The vehicle 810 may comprise an interior 812 of the vehicle 810, a map 813 inside the vehicle 810, a speaker 814 that outputs verbal commands regarding an intended or planned action of the vehicle 810, and a microphone 815 that detects commands from a person inside the vehicle 810 or from another vehicle or person within a predetermined distance of the vehicle 810. In some embodiments, the map 813 may illustrate a neighboring vicinity or environment of the vehicle 810, which includes the another vehicle 820, the another vehicle 860, and another vehicle 850 intending to merge onto the lane 880. The another vehicle 850 may merge into the lane 880 via trajectory 852. The determining engine 124 of the vehicle 810 may determine that a planned course of action of the vehicle 810 comprises yielding to the another vehicle 850 as the another vehicle attempts to merge between the vehicle 810 and the another vehicle 860. The determining engine 124 may determine that an action of yielding to the another vehicle 850 has a safety that is above a predetermined threshold. The communicating engine 126 of the vehicle 810 may have received a command from the another vehicle 850 that the another vehicle 850 intends to merge into the lane 880. The communicating engine 126 of the vehicle 810 may output a command, for example, via the speaker 814, to a person inside the vehicle 810, to the another vehicle 820, the another vehicle 860, and/or to a vehicle directly behind the vehicle 810, that the vehicle 810 will yield to the another vehicle 850.

In FIG. 8, a vehicle 810, which may be implemented as the vehicle 101, may be driving in a lane 880, along with another vehicle 810. The lane 880 may be adjacent to a lane 890 in which another vehicle 820 is driving. The vehicle 810 may comprise an interior 812 of the vehicle 810, a map 813 inside the vehicle 810, a speaker 814 that outputs verbal commands regarding an intended or planned action of the vehicle 810, and a microphone 815 that detects commands from a person inside the vehicle 810 or from another vehicle or person within a predetermined distance of the vehicle 810. In some embodiments, the map 813 may illustrate a neighboring vicinity or environment of the vehicle 810, which includes the another vehicle 820, the another vehicle 860, and another vehicle 850 intending to merge onto the lane 880. The another vehicle 850 may merge into the lane 880 via trajectory 852. The determining engine 124 of the vehicle 810 may determine that a planned course of action of the vehicle 810 comprises yielding to the another vehicle 850 as the another vehicle attempts to merge between the vehicle 810 and the another vehicle 860. The determining engine 124 may determine that an action of yielding to the another vehicle 850 has a safety that is above a predetermined threshold. The communicating engine 126 of the vehicle 810 may have received a command from the another vehicle 850 that the another vehicle 850 intends to merge into the lane 880. The communicating engine 126 of the vehicle 810 may output a command, for example, via the speaker 814, to a person inside the vehicle 810, to the another vehicle 820, the another vehicle 860, and/or to a vehicle directly behind the vehicle 810, that the vehicle 810 will yield to the another vehicle 850.

Figure 9:
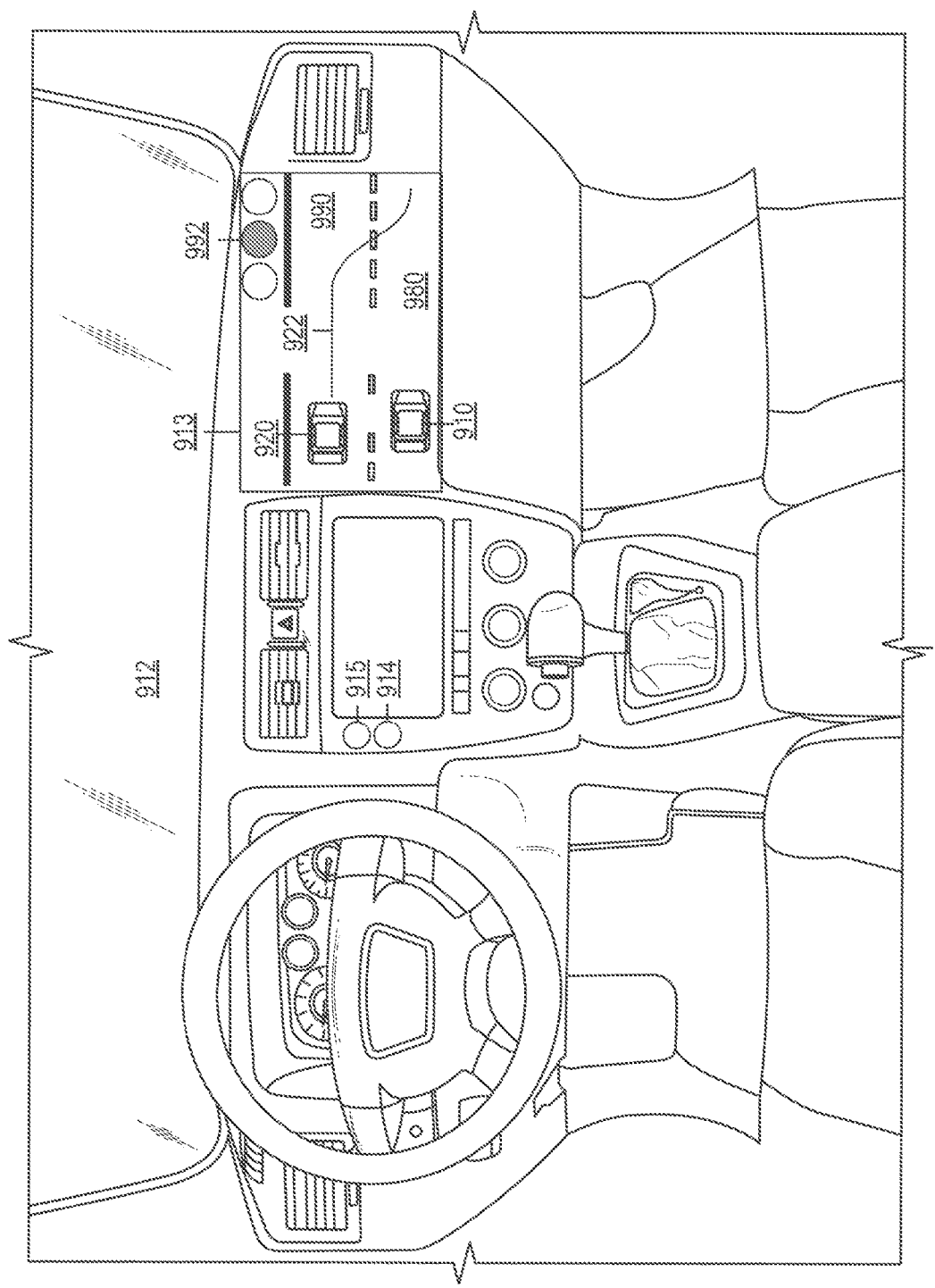

In FIG. 9, a vehicle 910, which may be implemented as the vehicle 101, may be driving in a lane 980. The lane 980 may be adjacent to a lane 990 in which another vehicle 920 is driving. The vehicle 910 may comprise an interior 912 of the vehicle 910, a map 913 inside the vehicle 910, a speaker 914 that outputs verbal commands regarding an intended or planned action of the vehicle 910, and a microphone 915 that detects commands from a person inside the vehicle 910 or from another vehicle or person within a predetermined distance of the vehicle 910. In some embodiments, the map 913 may illustrate a neighboring vicinity or environment of the vehicle 910, which includes the another vehicle 920. The another vehicle 920 may have signaled or communicated its intent to merge into the lane 980 via trajectory 922. The determining engine 124 of the vehicle 910 may determine that a planned course of action of the vehicle 910 comprises first passing through the traffic light 992, which may currently be at a yellow stage, and then yielding to the another vehicle 920 after passing through the traffic light 992, so that the vehicle 910 or the vehicle 920 does not get stuck at a red light, or attempting to merge during a red light. The determining engine 124 may determine that the aforementioned course of action has a safety that is above a predetermined threshold. The communicating engine 126 of the vehicle 910 may have received a command from the another vehicle 920 that the another vehicle 950 intends to merge into the lane 980. The communicating engine 126 of the vehicle 910 may output a command, for example, via the speaker 914, to a person inside the vehicle 910, to the another vehicle 920, and/or to a vehicle directly behind the vehicle 910, that the vehicle 910 will attempt to pass the traffic light 992 without slowing down or yielding and then yield to the another vehicle 920 after passing through the traffic light 992.

Figure 10A:
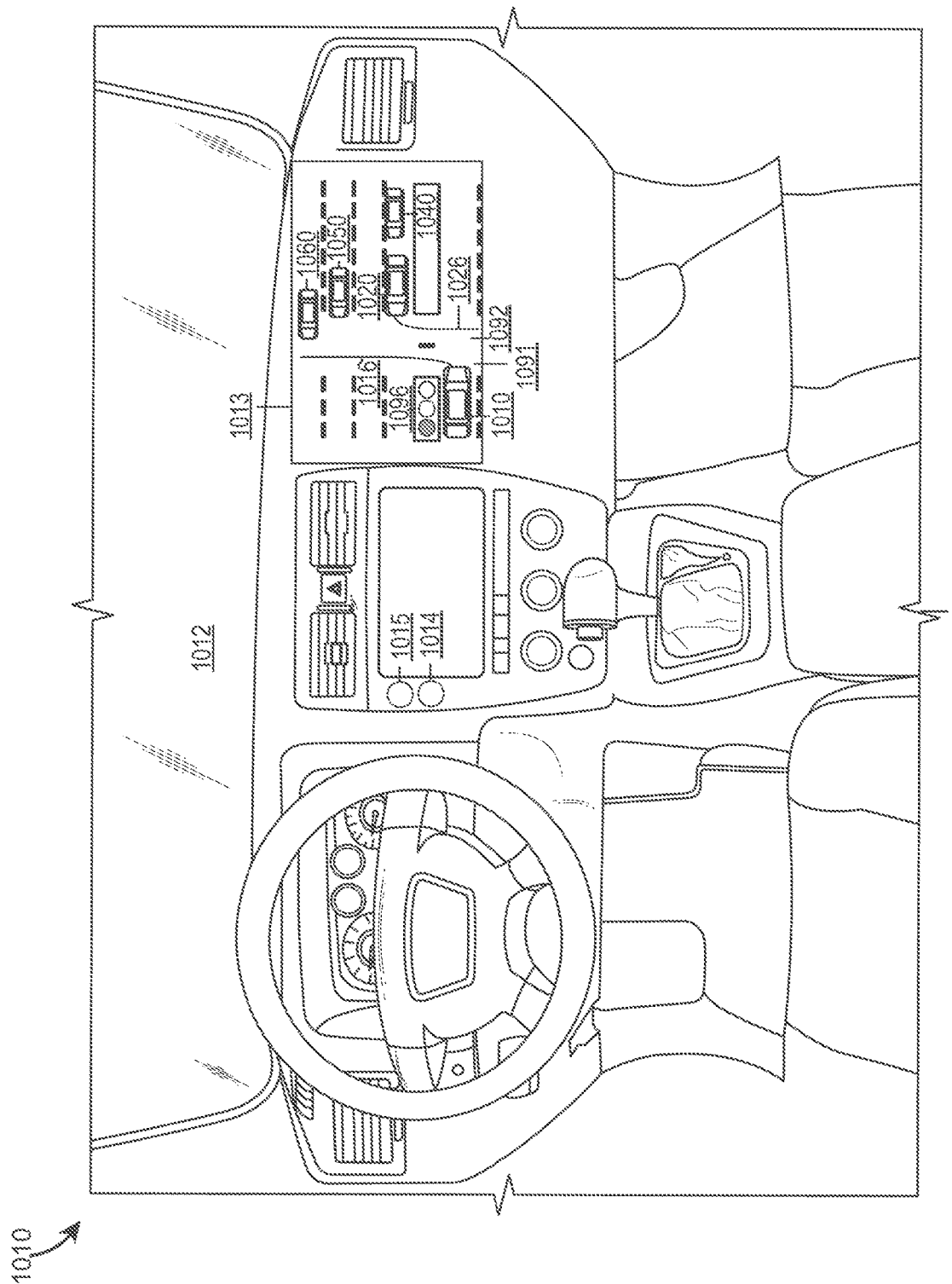

In FIG. 10A, a vehicle 1010, which may be implemented as the vehicle 101, may be preparing to make a left turn into lane 1091 via a trajectory 1016. The vehicle 1010 may comprise an interior 1012 of the vehicle 1010, a map 1013 inside the vehicle 1010, a speaker 1014 that outputs verbal commands regarding an intended or planned action of the vehicle 1010, and a microphone 1015 that detects commands from a person inside the vehicle 1010 or from another vehicle or person within a predetermined distance of the vehicle 1010. In some embodiments, the map 1013 may illustrate a neighboring vicinity or environment of the vehicle 1010, which includes another vehicle 1020, another vehicle 1040, another vehicle 1050, and another vehicle 1060. The another vehicle 1020 may have signaled or communicated its intent to make a turn and merge into lane 1092 via a trajectory 1026. The determining engine 124 of the vehicle 1010 may determine that a planned course of action of the vehicle 1010 comprises determining a time at which to make a left turn onto the lane 1091, while avoiding a collision with the another vehicles 1020, 1040, 1050, and 1060, based on respective predicted velocities and/or trajectories of the another vehicles 1020, 1040, 1050, and 1060, and based on a traffic light 1096 still being green. Since the another vehicle 1020 has signaled or communicated its intent to turn, the vehicle 1010 may not need to worry about the another vehicle 1020, except not to make a turn that is too wide that the trajectory 1016 would overlap with the trajectory 1026. Assume that to left a left turn, the vehicle 1010 must yield to opposing traffic. In one example, the determining engine 124 may determine that the planned course of action is to make a left turn after an amount of time, such as after three seconds, when making a left turn would have a safety that is above a predetermined threshold. The communicating engine 126 of the vehicle 1010 may have received a command from the another vehicle 1020 that the another vehicle 1020 plans to turn. The communicating engine 126 of the vehicle 1010 may output a command, for example, via the speaker 1014, to a person inside the vehicle 1010, to the another vehicle 1020, 1040, 1050, 1060, and/or to a vehicle directly behind the vehicle 1010, that the vehicle 1010 will make a left turn after a predetermined time when the vehicle 1010 determines a left turn to be a safe course of action based on opposing traffic.

Figure 10B:
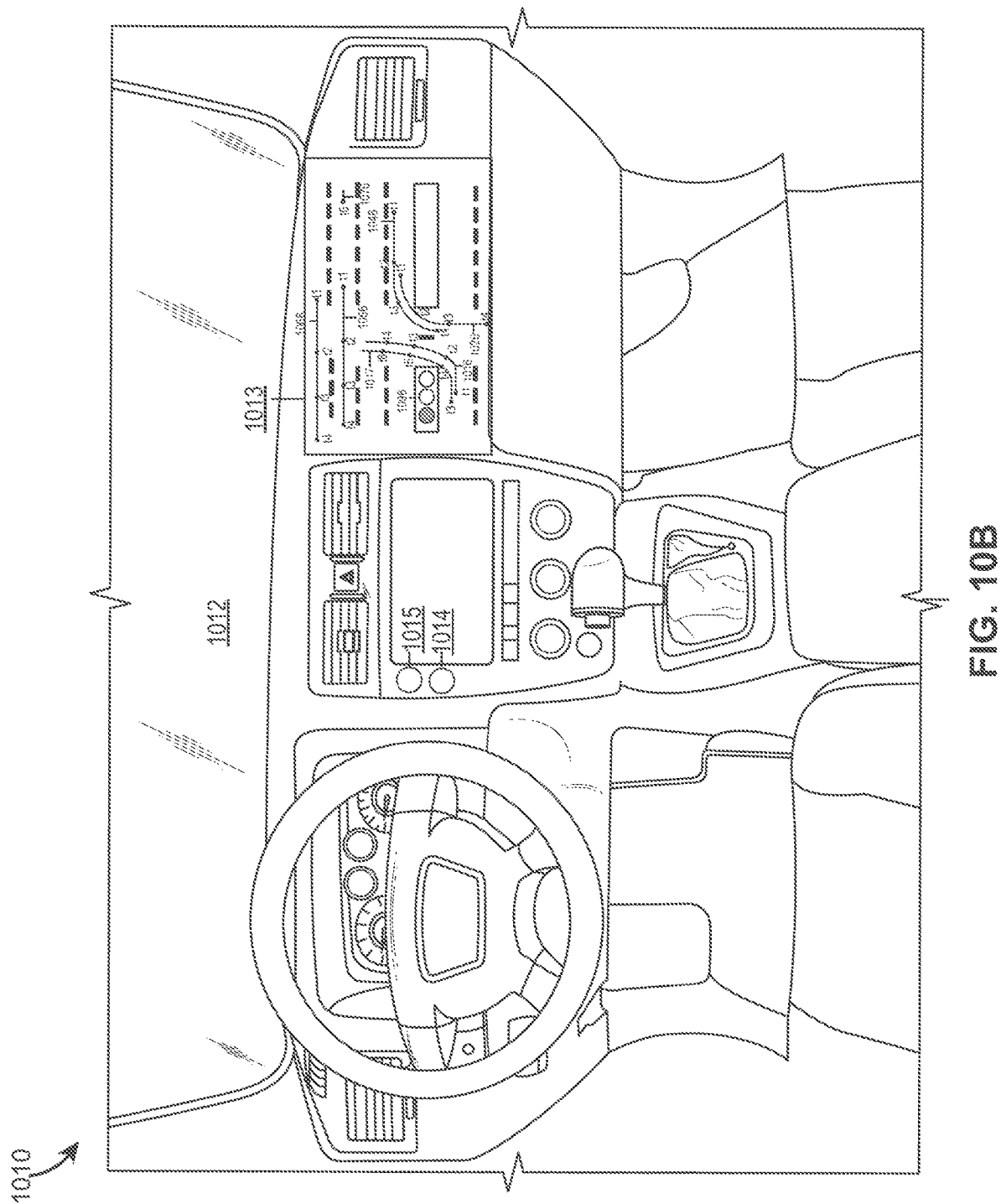

In FIG. 10B, a vehicle 1010, which may be implemented as the vehicle 101, may comprise an interior 1012 of the vehicle 1010, a map 1013 inside the vehicle 1010, a speaker 1014 that outputs verbal commands regarding an intended or planned action of the vehicle 1010, and a microphone 1015 that detects commands from a person inside the vehicle 1010 or from another vehicle or person within a predetermined distance of the vehicle 1010. In some embodiments, the map 1013 may illustrate trajectories of the vehicle 1010 as the vehicle 1010 is making a left turn during a green light at a traffic light 1096, along with trajectories of other vehicles. In particular, a trajectory 1016 shows the vehicle 1010 turning starting at time t1, which, for example, may be at time 0 seconds. A trajectory 1026 shows the vehicle 1020 turning starting at time t1. A trajectory 1046 shows the vehicle 1040 driving starting at time t1 and eventually making a turn. A trajectory 1056 shows the vehicle 1050 driving starting at time t1. A trajectory 1066 shows the vehicle 1060 driving starting at time t1. A trajectory 1017 shows the vehicle 1010 turning starting at time t3, which may be at time 2 seconds. The predicted trajectories shown in the map 1013 may provide information of a predicted location of each vehicle at a given time to ensure that respective paths of each of the vehicles do not cross at any particular time.

Figure 11:
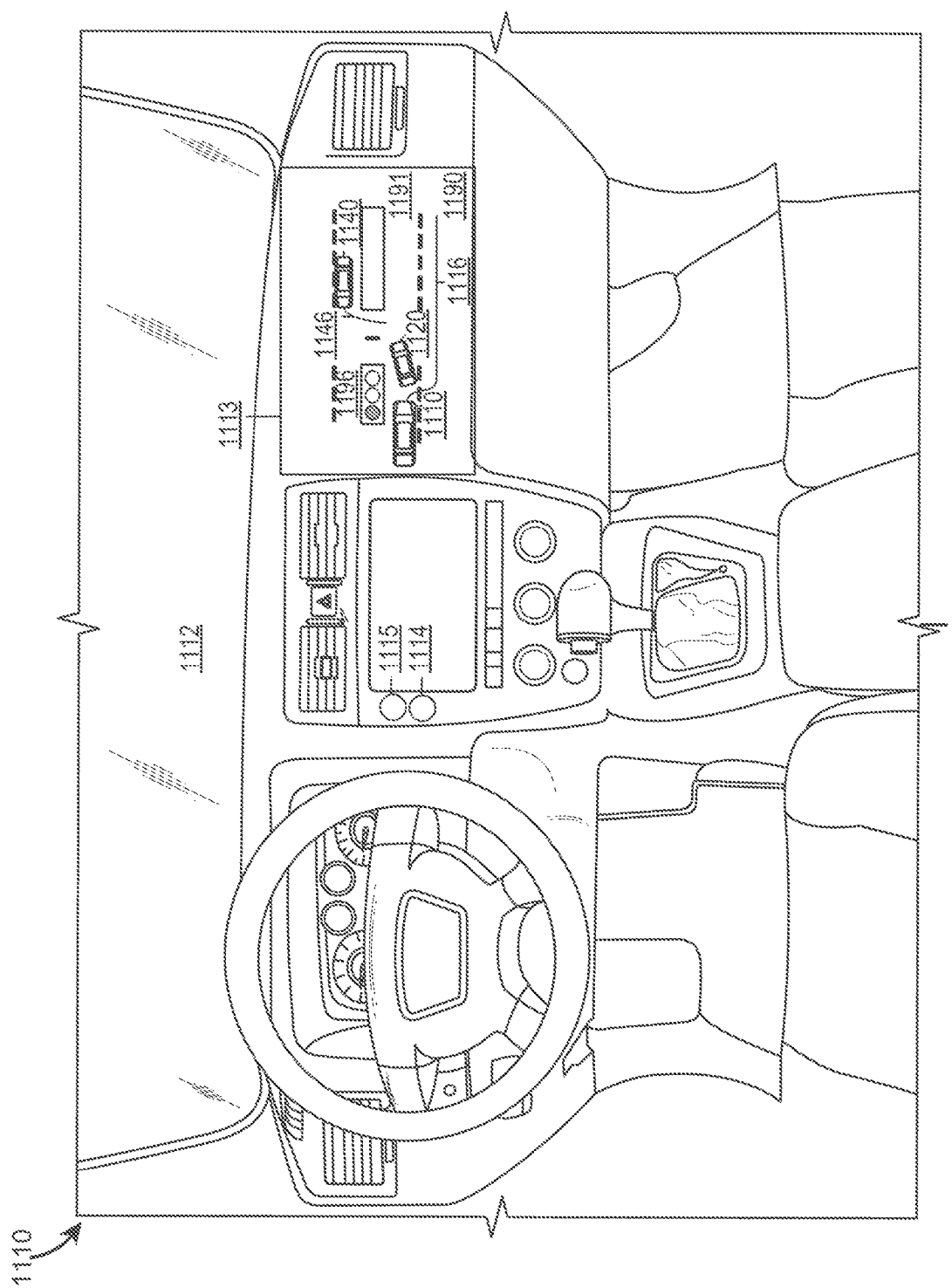

In FIG. 11, a vehicle 1110, which may be implemented as the vehicle 101, may be driving behind another vehicle 1120 that is preparing to make a left turn from lane 1191. The vehicle 1110 may comprise an interior 1112 of the vehicle 1110, a map 1113 inside the vehicle 1110, a speaker 1114 that outputs verbal commands regarding an intended or planned action of the vehicle 1110, and a microphone 1115 that detects commands from a person inside the vehicle 1110 or from another vehicle or person within a predetermined distance of the vehicle 1110. In some embodiments, the map 1113 may illustrate a neighboring vicinity or environment of the vehicle 1110, which includes the another vehicle 1120 and another vehicle 1140. The another vehicle 1120 may have signaled or communicated its intent to make a left turn. The determining engine 124 of the vehicle 1110 may determine that a planned course of action of the vehicle 1110 comprises switching to lane 1190 to avoid being stuck behind the another vehicle 1120 that is waiting to make a left turn. The planned course of action may include determining whether the another vehicle 1140 is making a left turn. If the another vehicle 1140 is making a left turn, the determining engine 124 may ensure that the planned trajectory 1116 of the vehicle 1110 does not coincide with a trajectory 1146 of the another vehicle 1140 at any particular time to avoid a collision with the another vehicle 1140. The communicating engine 126 of the vehicle 1110 may have received a command from the another vehicle 1120 that the another vehicle 1120 plans to turn left, and/or received a command from the another vehicle 1140 that the another vehicle 1140 plans to turn left. The communicating engine 126 of the vehicle 1110 may output a command, for example, via the speaker 1114, to a person inside the vehicle 1110, to the another vehicle 1120, to the another vehicle 1140, a vehicle directly behind the vehicle 1110, and/or a vehicle on the lane 1190, that the vehicle 1110 will switch to the lane 1190 when the vehicle 1110 determines that switching to the lane 1190 is safe based on traffic on the lane 1190 and/or the predicted trajectory 1146 of the another vehicle 1140.

Figure 12:
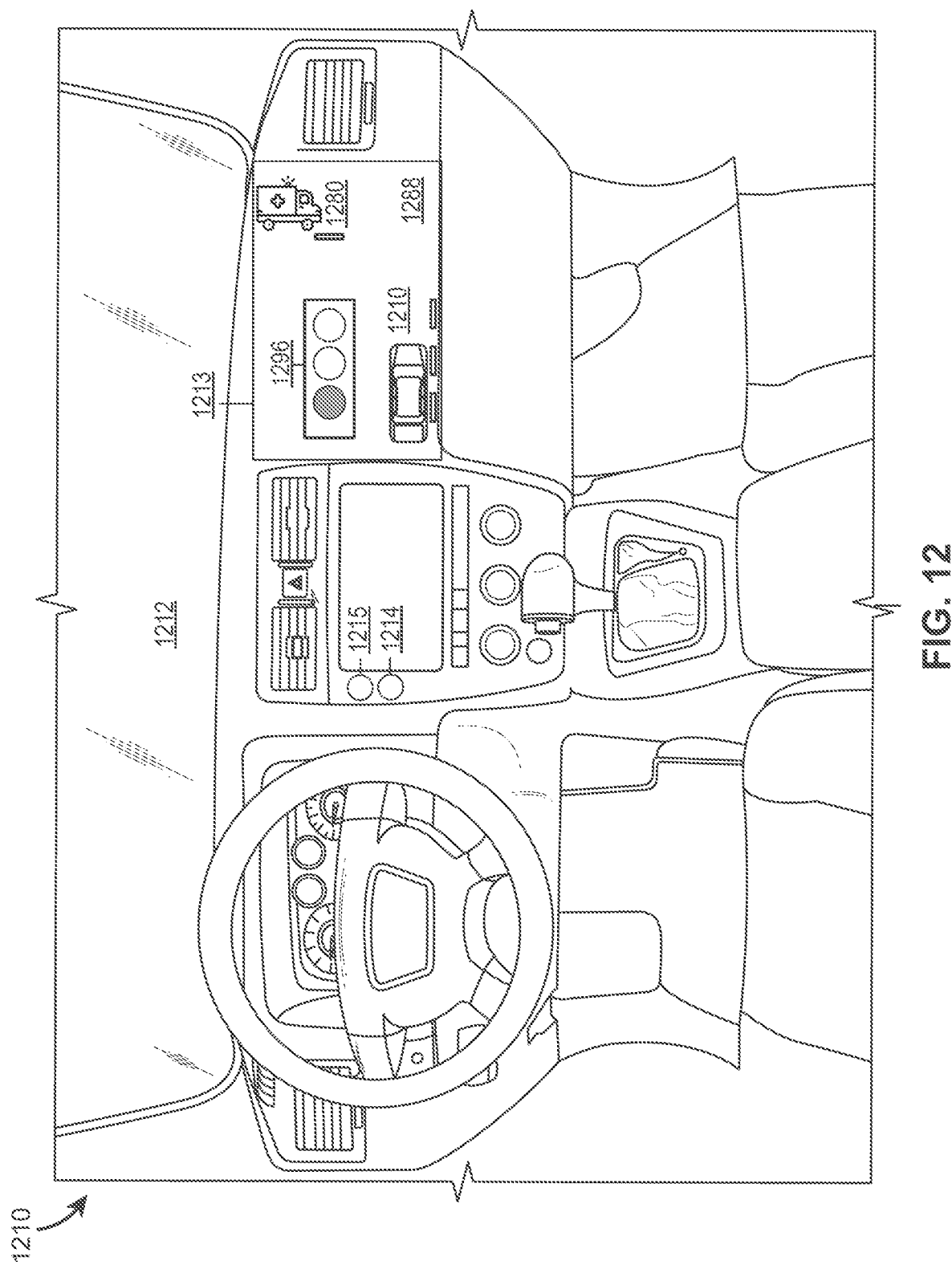

In FIG. 12, a vehicle 1210, which may be implemented as the vehicle 101, may be driving as an emergency vehicle 1280, such as an ambulance, is driving on a lane 1288 while a traffic light 1296 is green. The vehicle 1210 may comprise an interior 1212 of the vehicle 1210, a map 1213 inside the vehicle 1210, a speaker 1214 that outputs verbal commands regarding an intended or planned action of the vehicle 1210, and a microphone 1215 that detects commands from a person inside the vehicle 1210 or from another vehicle or person within a predetermined distance of the vehicle 1210. In some embodiments, the map 1213 may illustrate a neighboring vicinity or environment of the vehicle 1210, which includes the emergency vehicle 1280. The determining engine 124 of the vehicle 1210 may determine that a planned course of action of the vehicle 1210 comprises stopping or pulling over to a side of a road until the emergency vehicle 1280 has passed the vehicle 1210 by at least a predetermined distance. The communicating engine 126 of the vehicle 1210 may output a command, for example, via the speaker 1214, to a person inside the vehicle 1210, that the vehicle 1210 will stop or pull over to the side of the road.

Figure 13:
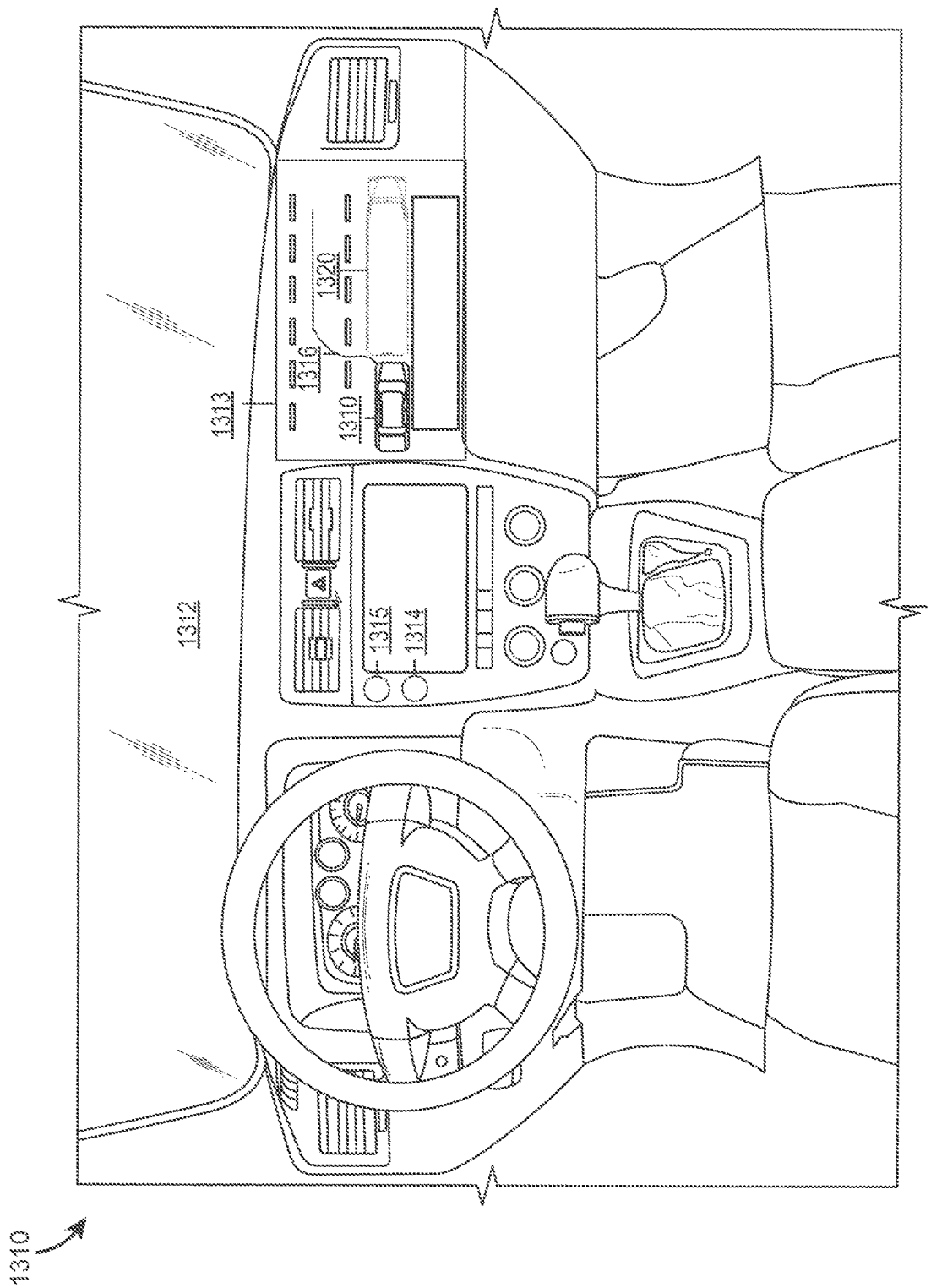

In FIG. 13, a vehicle 1310, which may be implemented as the vehicle 101, may be stopped in front of a bus 1320. The vehicle 1310 may comprise an interior 1312 of the vehicle 1310, a map 1313 inside the vehicle 1310, a speaker 1314 that outputs verbal commands regarding an intended or planned action of the vehicle 1310, and a microphone 1315 that detects commands from a person inside the vehicle 1310 or from another vehicle or person within a predetermined distance of the vehicle 1310. In some embodiments, the map 1313 may illustrate a neighboring vicinity or environment of the vehicle 1310, which includes the bus 1320. The determining engine 124 of the vehicle 1310 may determine that a planned course of action of the vehicle 1310 comprises changing a lane to pass the bus 1320 via a trajectory 1316 when safe to do so. The communicating engine 126 of the vehicle 1310 may output a command, for example, via the speaker 1314, to a person inside the vehicle 1310, that the vehicle 1310 will change lanes in a direction to the left.

In FIG. 13, a vehicle 1310, which may be implemented as the vehicle 101, may be stopped in front of a bus 1320. The vehicle 1310 may comprise an interior 1312 of the vehicle 1310, a map 1313 inside the vehicle 1310, a speaker 1314 that outputs verbal commands regarding an intended or planned action of the vehicle 1310, and a microphone 1315 that detects commands from a person inside the vehicle 1310 or from another vehicle or person within a predetermined distance of the vehicle 1310. In some embodiments, the map 1313 may illustrate a neighboring vicinity or environment of the vehicle 1310, which includes the bus 1320. The determining engine 124 of the vehicle 1310 may determine that a planned course of action of the vehicle 1310 comprises changing a lane to pass the bus 1320 via a trajectory 1316 when safe to do so. The communicating engine 126 of the vehicle 1310 may output a command, for example, via the speaker 1314, to a person inside the vehicle 1310, that the vehicle 1310 will change lanes in a direction to the left.

Figure 14:
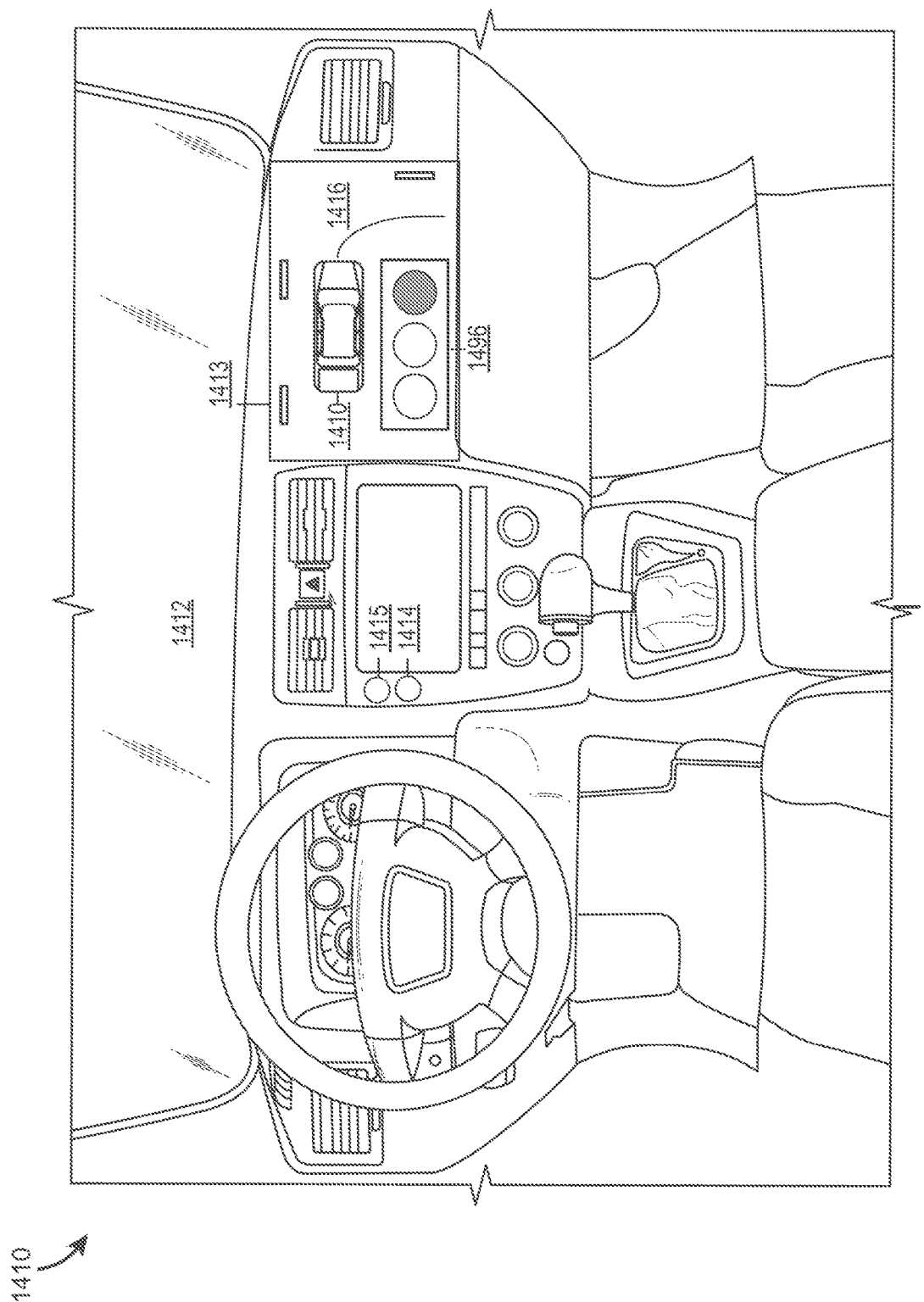

In FIG. 14, a vehicle 1410, which may be implemented as the vehicle 101, may be stopped at a red traffic light 1496 and determining whether to turn right while the traffic light 1496 is red. The vehicle 1410 may comprise an interior 1412 of the vehicle 1410, a map 1413 inside the vehicle 1410, a speaker 1414 that outputs verbal commands regarding an intended or planned action of the vehicle 1410, and a microphone 1415 that detects commands from a person inside the vehicle 1410 or from another vehicle or person within a predetermined distance of the vehicle 1410. In some embodiments, the map 1413 may illustrate a neighboring vicinity or environment of the vehicle 1410. The determining engine 124 of the vehicle 1410 may determine that a planned course of action of the vehicle 1410 comprises making a right turn when safe to do so even when the traffic light 1496 is red. The communicating engine 126 of the vehicle 1410 may output a command, for example, via the speaker 1414, to a person inside the vehicle 1410, that the vehicle 1410 will turn right in a predetermined or a certain amount of time, for example, in one second.

Figure 15:
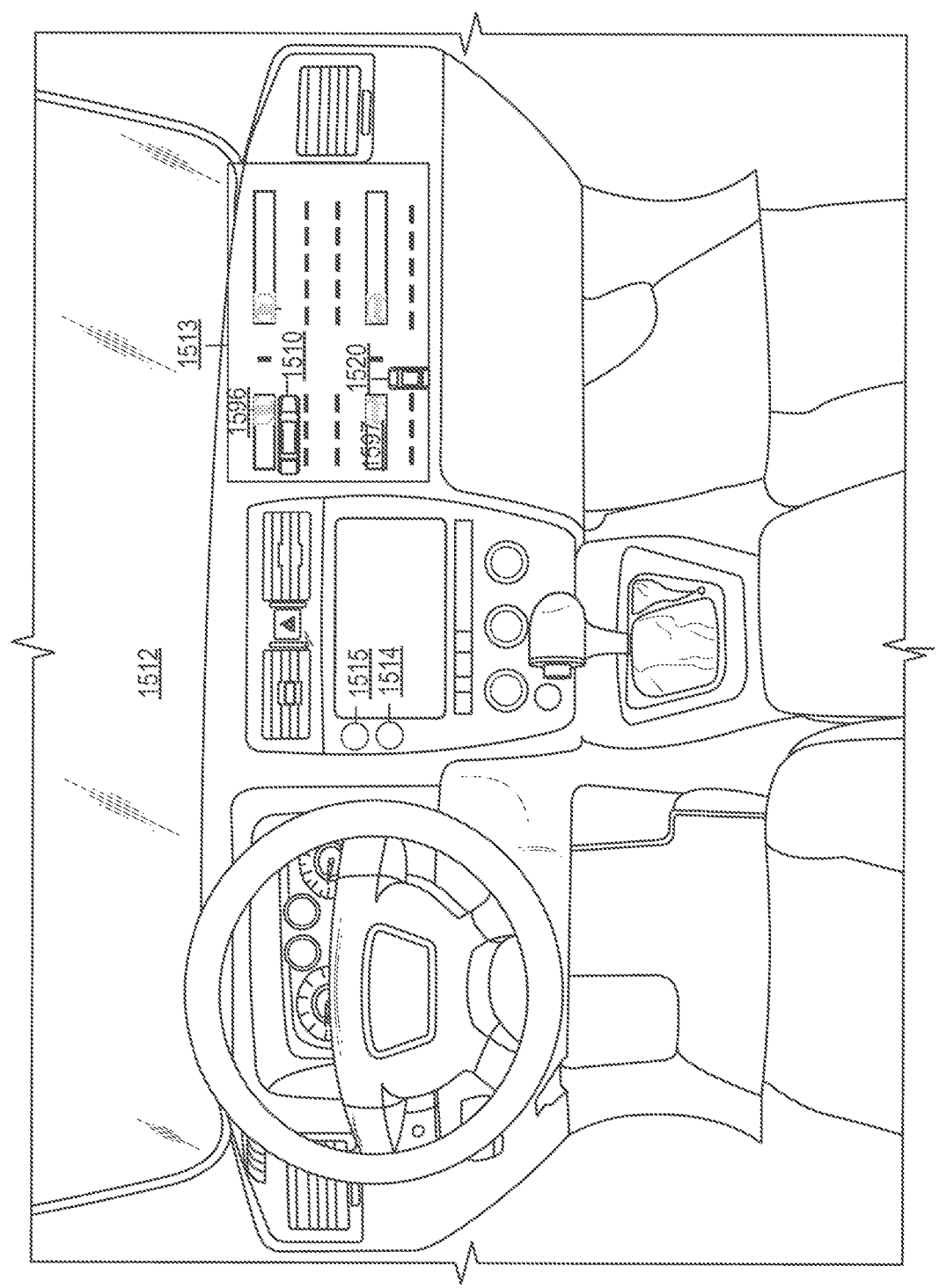

In FIG. 15, a vehicle 1510, which may be implemented as the vehicle 101, may be stopped at a stop sign 1596. The vehicle 1510 may comprise an interior 1512 of the vehicle 1510, a map 1513 inside the vehicle 1510, a speaker 1514 that outputs verbal commands regarding an intended or planned action of the vehicle 1510, and a microphone 1515 that detects commands from a person inside the vehicle 1510 or from another vehicle or person within a predetermined distance of the vehicle 1510. In some embodiments, the map 1513 may illustrate a neighboring vicinity or environment of the vehicle 1510. The determining engine 124 of the vehicle 1510 may determine that a planned course of action of the vehicle 1510 comprises determining whether the vehicle 1510, whether other vehicles such as another vehicle 1520 is behaving in accordance with right-of-way rules, and whether and when to proceed past the stop sign 1596. In some embodiments, the communicating engine 126 of the vehicle 1510 may output a command, for example, via the speaker 1514, to a person inside the vehicle 1510 and/or to the another vehicle 1520, that the vehicle 1510 will proceed past the stop sign 1596 after a predetermined or a certain amount of time, for example, in one second. Alternatively, the communicating engine 126 of the vehicle 1510 may output a command that the vehicle 1510 will remain stopped at the stop sign 1596 for a predetermined or a certain amount of time, such as one or two seconds, or after another vehicle such as the another vehicle 1520 passes the stop sign 1596.

Figure 16:
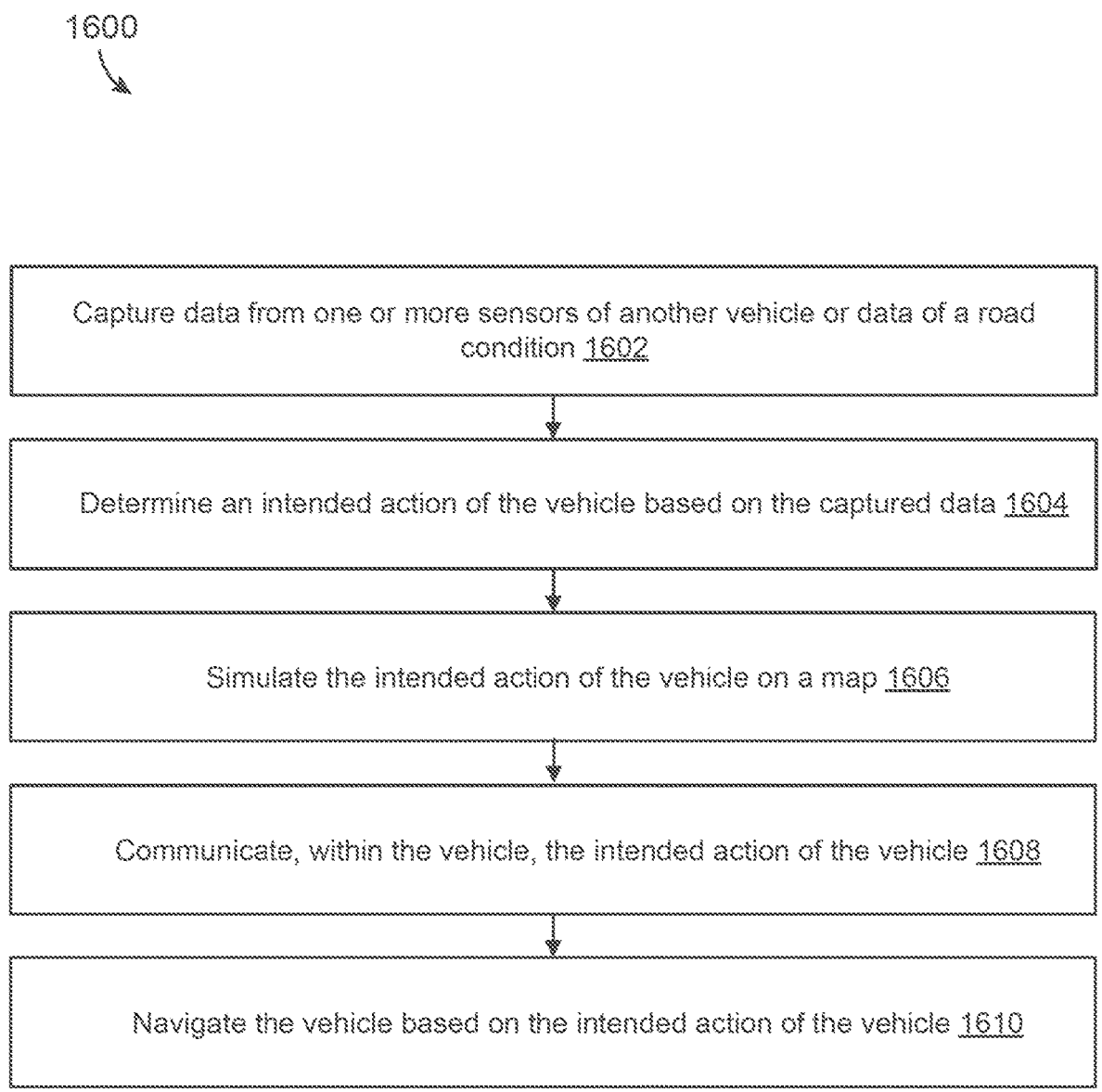
FIG. 16 illustrates a flowchart of an example of a method according to some embodiments of the present disclosure.

FIG. 16 illustrates a flowchart of a method according to some embodiments. In this and other flowcharts, the flowchart 1600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 16.

In step 1602, one or more processors may capture data from one or more sensors of another vehicle or data of a road condition. In step 1604, the one or more processors may determine an intended action of the vehicle based on the captured data. In step 1606, the one or more processors may simulate the intended action of the vehicle on a map. In step 1608, the one or more processors may communicate, within the vehicle, the intended action of the vehicle. In step 1610, the one or more processors may navigate the vehicle based on the intended action of the vehicle.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
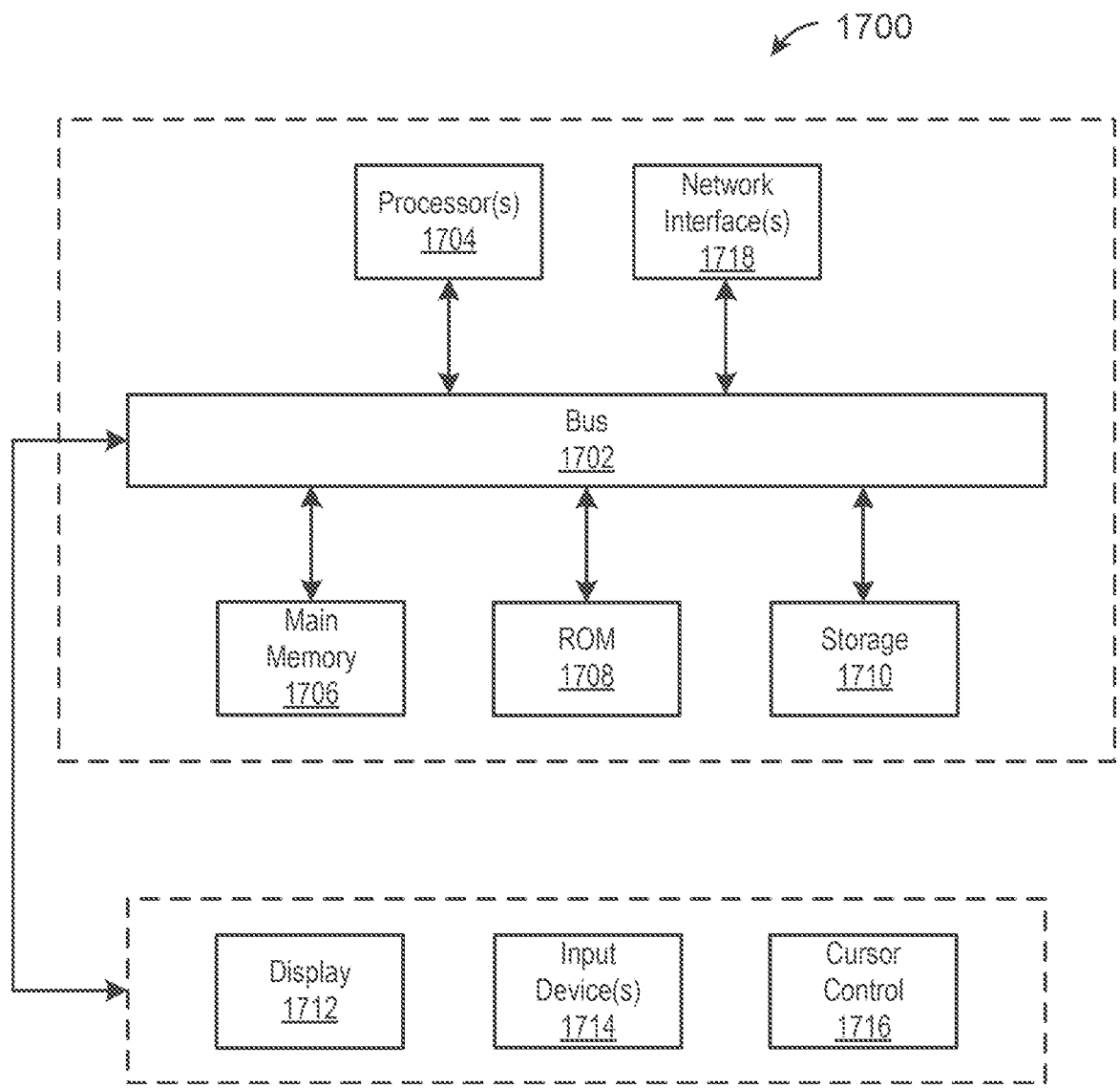
FIG. 17 is a diagram of an example computer system for implementing the features disclosed herein.

FIG. 17 is a block diagram that illustrates a computer system 1700 upon which any of the embodiments described herein may be implemented. The computer system 1700 includes a bus 1702 or other communication mechanism for communicating information, one or more hardware processors 1704 coupled with bus 1702 for processing information. Hardware processor(s) 1704 may be, for example, one or more general purpose microprocessors.

The computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions.

The computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions.

The computer system 1700 may be coupled via bus 1702 to output device(s) 1712, such as a cathode ray tube (CRT) or LCD display (or touch screen), for displaying information to a computer user. Input device(s) 1714, including alphanumeric and other keys, are coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor(s) 1704 executing one or more sequences of one or more instructions contained in main memory 1706. Such instructions may be read into main memory 1706 from another storage medium, such as storage device 1710. Execution of the sequences of instructions contained in main memory 1706 causes processor(s) 1704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may retrieves and executes the instructions. The instructions received by main memory 1706 may optionally be stored on storage device 1710 either before or after execution by processor 1704.

The computer system 1700 also includes a communication interface 1718 coupled to bus 1702. Communication interface 1718 provides a two-way data communication coupling to one or more network links that are connected to one or more local networks. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN (or WAN component to communicated with a WAN). Wireless links may also be implemented. In any such implementation, communication interface 1718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1718, which carry the digital data to and from computer system 1700, are example forms of transmission media.

The computer system 1700 can send messages and receive data, including program code, through the network (s), network link and communication interface 1718. In the Internet example, a server might transmit a requested code for an application program through the Internet, the ISP, the local network and the communication interface 1718.

The received code may be executed by processor 1704 as it is received, and/or stored in storage device 1710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system of a vehicle comprising:
   one or more sensors;
   one or more processors; and
   a memory storing instructions that, when executed by the one or more processors, cause the system to perform:
   capturing data from one or more sensors of another vehicle and data of a road condition, the road condition comprising an obstacle;
   determining an intended action of the vehicle based on the captured data, wherein the intended action comprises swerving into a different lane to avoid the obstacle;
   communicating, to a different vehicle on the different lane, an intention by the vehicle to swerve onto the different lane;
   receiving, from the different vehicle, an acknowledgement that the different vehicle is aware of the intention by the vehicle to swerve onto the different lane;
   simulating the intended action of the vehicle on a map;
   communicating, within the vehicle, the intended action of the vehicle, wherein the communicating comprises indicating:
      a relative or absolute position of the obstacle, and
      a size and a nature of the obstacle;
   receiving a command from a person inside the vehicle to perform an action that is different from the intended action;
   determining whether the action exceeds a safety threshold;
   in response to determining that the action exceeds the safety threshold, adjusting the intended action based on the command and navigating the vehicle based on the adjusted intended action of the vehicle; and
   in response to determining that the action fails to exceed the safety threshold:
      communicating to the person that the action fails to exceed the safety threshold;
      receiving a repeated command from the person to perform the action; and
      in response to receiving the repeated command, pulling over to a side or evacuating from a road.

2. The system of claim 1, wherein the simulating of the intended action of the vehicle is simultaneous with the communicating of the intended action.

3. The system of claim 1, wherein the capturing of data comprises capturing data from the one or more sensors of another vehicle closest to a current position of the vehicle.

4. The system of claim 1, wherein the determining an intended action of the vehicle comprises determining to change a lane, change a direction, or swerve to avoid the obstacle.

5. The system of claim 1, wherein the determining an intended action of the vehicle comprises determining whether to yield to another vehicle.

6. The system of claim 1, wherein the instructions further cause the system to perform:
receiving an input from the another vehicle of an intended action of the another vehicle;
adjusting the intended action of the vehicle based on the input; and
communicating the adjusted intended action to the another vehicle and within the vehicle.

7. The system of claim 1, further comprising a speaker configured to communicate the intended action within the vehicle.

8. The system of claim 1, wherein the instructions further cause the system to perform:
in response to determining that the action fails to exceed the safety threshold, modifying the intended action to an alternative that satisfies the safety threshold.

9. The system of claim 1, wherein the safety threshold is based on a likelihood of avoiding a collision with other vehicles and a pedestrian.

10. A method implemented by a computing system including one or more processors and storage media storing machine-readable instructions, wherein the method is performed using the one or more processors, the method comprising:
capturing data from one or more sensors of another vehicle and data of a road condition, the road condition comprising an obstacle;
determining an intended action of the vehicle based on the captured data, wherein the intended action comprises swerving into a different lane to avoid the obstacle;
communicating, to a different vehicle on the different lane, an intention by the vehicle to swerve onto the different lane;
receiving, from the different vehicle, an acknowledgement that the different vehicle is aware of the intention by the vehicle to swerve onto the different lane;
simulating the intended action of the vehicle on a map;
communicating, within the vehicle, the intended action of the vehicle, wherein the communicating comprises indicating:
a relative or absolute position of the obstacle, and
a size and a nature of the obstacle;
receiving a command from a person inside the vehicle to perform an action that is different from the intended action;
determining whether the action exceeds a safety threshold;
in response to determining that the action exceeds the safety threshold, adjusting the intended action based on the command and navigating the vehicle based on the adjusted intended action of the vehicle; and
in response to determining that the action fails to exceed the safety threshold:
communicating to the person that the action fails to exceed the safety threshold;
receiving a repeated command from the person to perform the action; and
in response to receiving the repeated command, pulling over to a side or evacuating from a road.

11. The method of claim 10, wherein the simulating of the intended action of the vehicle is simultaneous with the communicating of the intended action.

12. The method of claim 10, wherein the capturing of data comprises capturing data from the one or more sensors of another vehicle closest to a current position of the vehicle.

13. The method of claim 1, wherein the determining an intended action of the vehicle comprises determining to change a lane, change a direction, or swerve to avoid the obstacle.

14. The method of claim 10, wherein the determining an intended action of the vehicle comprises determining whether to yield to another vehicle.

15. The method of claim 10, further comprising:
receiving an input from the another vehicle of an intended action of the another vehicle;
adjusting the intended action of the vehicle based on the input; and
communicating the adjusted intended action to the another vehicle and within the vehicle.

16. The method of claim 10, wherein the communicating the intended action within the vehicle comprises communicating using a speaker.

* * * * *